United States Patent [19]
Rotunda et al.

[11] Patent Number: 5,747,955
[45] Date of Patent: May 5, 1998

[54] CURRENT SENSING MODULE FOR A VARIABLE SPEED AC MOTOR DRIVE FOR USE WITH A TREADMILL

[75] Inventors: John T. Rotunda, Bothell; Lester A. Hass, Duvall; Victor Pipinich, Seattle, all of Wash.

[73] Assignee: Quinton Instrument Company, Bothell, Wash.

[21] Appl. No.: 934,044

[22] Filed: Sep. 19, 1997

Related U.S. Application Data

[63] Continuation of Ser. No. 414,400, Mar. 31, 1995, abandoned.

[51] Int. Cl.$^6$ ........................................... H02P 7/00
[52] U.S. Cl. ........................... 318/434; 361/31; 361/96; 318/432; 482/54
[58] Field of Search ........................... 318/432, 434, 318/798–815; 388/903, 904, 930; 361/23, 30, 31, 42–50, 51, 87, 93, 94–97; 482/4, 6, 7, 54

[56] References Cited

U.S. PATENT DOCUMENTS

| | | |
|---|---|---|
| 1,607,002 | 11/1926 | Keller . |
| 3,392,316 | 7/1968 | Salihi . |
| 3,577,057 | 5/1971 | Dyer et al. . |
| 3,694,718 | 9/1972 | Graf et al. . |
| 3,704,403 | 11/1972 | Gillett . |
| 3,711,812 | 1/1973 | Cherry . |
| 3,737,163 | 6/1973 | Sumrall . |
| 3,819,992 | 6/1974 | Opal et al. . |
| 3,832,613 | 8/1974 | Bernstein et al. . |
| 3,919,891 | 11/1975 | Stuhlmuller et al. . |
| 3,954,018 | 5/1976 | O'Berto . |
| 3,984,744 | 10/1976 | Moody . |
| 4,019,106 | 4/1977 | Van Doren . |
| 4,021,700 | 5/1977 | Ellis-Anwyl ........................ 361/28 |
| 4,280,082 | 7/1981 | Acharya et al. . |
| 4,384,244 | 5/1983 | Matsumoto . |
| 4,426,075 | 1/1984 | Otte . |
| 4,481,457 | 11/1984 | Zach et al. . |
| 4,525,658 | 6/1985 | Yanagida . |
| 4,604,563 | 8/1986 | Min . |
| 4,628,235 | 12/1986 | Goings ........................ 318/434 X |
| 4,635,927 | 1/1987 | Shu . |
| 4,643,418 | 2/1987 | Bart . |
| 4,656,572 | 4/1987 | Caputo et al. . |
| 4,658,692 | 4/1987 | Bagus . |
| 4,691,694 | 9/1987 | Boyd et al. . |
| 4,749,181 | 6/1988 | Pittaway et al. . |
| 4,759,540 | 7/1988 | Yu et al. . |
| 4,792,134 | 12/1988 | Chen . |
| 4,842,266 | 6/1989 | Sweeney, Sr. et al. . |
| 4,910,450 | 3/1990 | Parker et al. . |
| 4,922,161 | 5/1990 | Gilliland et al. . |
| 4,928,956 | 5/1990 | Chen . |
| 4,944,713 | 7/1990 | Salerno . |
| 4,964,841 | 10/1990 | Takayama et al. . |
| 4,999,556 | 3/1991 | Masters . |
| 5,021,726 | 6/1991 | Reinhardt et al. . |
| 5,047,704 | 9/1991 | Yamauchi et al. ........................ 318/801 |
| 5,053,688 | 10/1991 | Rees . |
| 5,059,875 | 10/1991 | De Salme . |
| 5,088,297 | 2/1992 | Maruyama et al. . |
| 5,099,182 | 3/1992 | Isaacson et al. . |
| 5,130,626 | 7/1992 | Kajitani et al. . |

(List continued on next page.)

*Primary Examiner*—Jonathan Wysocki
*Attorney, Agent, or Firm*—Montgomery W. Smith; Richard D. Allison

[57] ABSTRACT

A current sensing module for use with a variable speed AC motor control drive system for use with devices such as treadmills and including a module to sense the current of pulse width modulated signals provided to an AC motor wherein the current sensing module includes a fast sense circuit to sense excessive current conditions in the pulse width modulated signals and a slow sense circuit to sense average current values in excess of desired values over a predetermined period of time to protect the AC motor from damage caused by the increased frictional resistance to the rotation of the walk belt on the treadmill deck as the walk belt and treadmill deck wear out.

21 Claims, 14 Drawing Sheets

U.S. PATENT DOCUMENTS

| | | |
|---|---|---|
| 5,140,248 | 8/1992 | Rowan et al. . |
| 5,141,479 | 8/1992 | Vanjani et al. . |
| 5,162,709 | 11/1992 | Ohi . |
| 5,168,439 | 12/1992 | Kumar et al. . |
| 5,220,264 | 6/1993 | Yamada . |
| 5,270,631 | 12/1993 | Takahashi et al. . |
| 5,361,022 | 11/1994 | Brown ........ 318/375 |
| 5,386,183 | 1/1995 | Cronvich et al. ........ 318/434 |
| 5,448,442 | 9/1995 | Farag ........ 361/24 |
| 5,463,294 | 10/1995 | Valdivia et al. ........ 318/432 |
| 5,488,279 | 1/1996 | Kawamoto et al. ........ 318/801 |

CURRENT SENSING MODULE FOR A VARIABLE SPEED AC MOTOR DRIVE FOR USE WITH A TREADMILL

This application is a continuation of application Ser. No. 08/414,400, filed Mar. 31, 1995, now abandoned.

BACKGROUND OF THE INVENTION

1. Field of the Invention

The invention relates to a system for controlling and sensing the operation of an AC induction drive motor and more specifically to a system for sensing the current of the pulse width modulated (PWM) signal that powers an AC induction drive motor in a treadmill to detect the occurrence of fast and slow fault conditions.

2. Description of Related Art

Many treadmills have walk belts powered by AC drive motors. These AC drive motors rotate pulleys and walk belts at speeds that depend on the frequency of the AC power provided to the motor.

When a person walks or runs on a treadmill the impact of the person's foot on the walk belt pushes the walk belt into frictional contact with the treadmill deck of the treadmill. This frictional contact between the walk belt and the treadmill deck resists the smooth movement of the walk belt and creates an increased resistance to the rotation of the pulleys and motor. A number of solutions have been proposed to reduce the amount of friction between the walk belt and treadmill deck. One commonly used approach involves coating the treadmill deck and/or walk belt with a wax or lubricous coating. A difficulty with this approach is that the wax or lubricous coating has a tendency to wear off after extended use. The amount of frictional resistance to the movement of the walk belt on the treadmill deck also varies greatly between users and is a function of the person's stride, weight and various other factors.

We have found that when a person is walking or running on the treadmill at a relatively continuous pace, the amount of frictional resistance to the rotation of the walk belt is nearly sinusoidal in nature. The frictional resistance is at its maximum when the person is planting his foot and is at its minimum or near zero when the person is pushing off the walk belt surface with his foot. This periodic increase in frictional resistance to the movement of the walk belt translates into a variable load applied to the AC drive motor of the treadmill. Because the frictional resistance of a person walking or running on the walk belt at a relatively constant speed is nearly sinusoidal in nature, the load placed on the AC drive motor by the person walking or running on the walk belt is also nearly sinusoidal in nature. The adjustment to the application of a variable load to the AC drive motor is important in maintaining the speed of treadmills relatively constant and is particularly noticeable when a heavier person plants his foot on the walk belt and the speed of the walk belt is at a minimum or lower speed.

The increased load on the AC drive motor caused by the user walking on the walk belt causes a drop in the high voltage DC supply across the filter capacitor. This reduction in the high voltage DC supply reduces the available voltage to power the motor which causes the performance and torque produced by the electronic drive to deteriorate.

It is highly desirable for the AC drive motor to maintain a constant speed at a given AC power frequency despite the varying loads placed on the drive motor during use of the treadmill. The constant speed of the AC drive motor requires the maintenance of a constant magnetic flux density in the windings of the AC drive motor.

Some currently available AC drive motors receive power through a pulse width modulated (PWM) DC signal. By controlling the duty cycles of the pulses in the PWM signals, signals are produced that, when applied to the AC motor, act like AC signals of any desired frequency. This allows the AC drive motor to operate at a desired speed by setting the duty cycle of the PWM signals to produce AC signals at a frequency determined to produce the desired speed of the AC motor.

A prior art system for producing a PWM signal to drive an AC drive motor is disclosed in U.S. Pat. No. 5,140,248 granted to Rowan et al. In this system, the motor control or drive includes a power section that receives power at a line frequency of 60 Hz from a three phase AC power source. The three phases of the power source are connected to an AC-DC power converter in the power section of the drive. The AC-DC power converter passes the AC signal through a full-bridge rectifier system that converts the AC signal into a near DC signal on a DC bus that connects to power inputs on a pulse width modulation voltage inverter which completes the power section of the drive. The PWM inverter includes a group of switching elements which are turned on and off to convert the DC voltage to pulses of constant magnitude.

The pulse train pattern from the PWM inverter is characterized by a first set of positive going pulses of constant magnitude but of varying pulse width and by a second set of negative going pulses of constant magnitude but of varying pulse width. The RMS value of the pulse train pattern approximates one cycle of a sinusoidal signal which is characteristic of an AC wave form. The pattern is repeated to generate additional cycles of the AC wave form.

To control the frequency and, magnitude of the resultant AC power signals to the motor, AC inverter phase control signals are applied to the PWM inverter. The PWM voltage inverter receives three balanced AC inverter phase control signals which vary in phase by 120 degrees, and the magnitude and the frequency of these signals determines the pulse widths and the number of pulses in the pulse trains which are applied to the terminals of the motor. The inverter phase control signals are produced as a result of a 2 phase to 3 phase conversion which is accomplished with a 2 to 3 phase converter.

U.S. Pat. No. 5,140,248 granted to Rowan et al., also discloses a motor controller system which attempts to maintain current constant for a fixed load by limiting the current provided to the motor. As shown in FIG. 1, a microprocessor-based PWM generator produces PWM signals that control switches passing or not passing DC power to the AC motor in response to the PWM signals from the PWM generator. The current at each of the switches is sensed, passed through an A-to-D converter and presented to the microprocessor. As the current at the switches drops below an acceptable level, the microprocessor causes the PWM signals to that switch to have a longer duty cycle so that the input signal is adjusted to regulate the current to the motor.

As described above, various PWM controller systems for AC motors are generally known. Some of these systems sense the PWM signal as it is presented to the drive motor. These systems pass information about the sensed condition of the PWM signal to the PWM generator to modify the PWM signal. However, these systems do not sense the condition of the bus voltage and do not vary the PWM signal directly to account for the variation in the bus voltage.

When the AC drive motor has a load applied to it, the DC bus voltage drops. Unless the PWM signal is modified, there is insufficient energy provided to the drive motor to maintain a constant speed. Consequently, it is desirable to create a system that senses the load placed on the AC drive motor and adjusts the PWM signal accordingly to produce a near constant drive motor speed and a corresponding constant treadmill belt speed for treadmills despite varying loads.

One approach to solving this problem is to use line voltage to determine the voltage supplied to the AC drive motor through the PWM signal. The difficulty with this approach is that the line voltage varies considerably from place to place and even from time to time at the same place. In the U.S. the line voltage typically varies from about 100 volts to about 130 volts, a 30% variation or between about 99 V to 132 V for a 33% variation. In the PWM system described above, this variation in line voltage produces a variation in the bus voltage supplied to the PWM drives of about 280 volts for a 99-volt line to about 368 volts, less bridge drops and bus sag, for a 130-volt line or 373 volts for a 132 volt line. The bus voltage is used to determine the amplitude of the PWM signal. To maintain a constant magnetic flux density in the windings of the AC drive motor despite the load placed on the AC drive motor by a person walking or running on the treadmill belt, the PWM signal corresponding to the 99-volt line must be different from the PWM signal corresponding to a line voltage of about 115 volts.

Although it may be possible to pass a rectified and filtered signal through a voltage regulator to provide a non-varying voltage to the PWM drivers and subsequently to the AC drive motor, the cost and the complexity of such a system renders this type of approach impractical for large scale manufacture or for use in relatively inexpensive applications. For example, in treadmills, a current of 10 amps is frequently drawn by the AC drive motor. Even at the low voltage of 99-volt AC described above, a maximum of about 2000 watts of electrical power is used by the AC drive motor. Voltage regulators capable of handling 2000 watts are expensive and typically require a large number of components, any one of which may fail or disable the voltage regulator during use.

It is, therefore, an object of the invention to provide a method and device for maintaining the flux density of a drive motor constant through drive voltage PWM generators that are inexpensive to manufacture and reliable.

It is a further object of the invention to provide a device for monitoring or regulating the flux density of a drive motor with a PWM driver that is reliable.

SUMMARY OF THE INVENTION

One basic consideration of an AC motor constructed in accordance with the present invention is that the speed regulation of the AC motor is approximately determined by the relation:

Voltage/Frequency=Constant Flux Density

Thus, by varying the frequency while keeping the flux constant and changing the PWM drive voltage, the speed of the motor is controlled. An additional benefit to this system is that by keeping the flux constant, a near constant torque profile on the drive motor is produced despite the varied speed of rotation.

An embodiment of the present invention includes an AC drive motor control system having an adaptive bus scaling (ABS) system. The motor control system of the present invention converts line AC power to DC power which provides the bus voltage to switches controlled by a pulse width modulated signal generator. The PWM signal generator modulates the DC power to produce three phase PWM drive signals. The PWM drive signals are passed to the AC drive motor. The PWM drive signals appear to the AC drive motor as sine waves of a predetermined frequency.

The adaptive bus scaling (ABS) system senses the DC voltage of the bus providing power to the PWM switches. As described above, changes will occur in the DC bus voltage for various reasons, including as a result of a user walking on the treadmill and because of fluctuations in the line voltage used to produce the DC bus voltage. The ABS system senses the voltage changes as they occur in the DC bus voltage and passes the sensed bus voltage to the three phase PWM signal generator.

The PWM signal generator then manipulates the duty cycle of the PWM control signals to maintain a constant magnetic flux density in the windings of the AC drive motor. When the DC bus voltage drops, the PWM signal generator increases the duty cycle of the PWM control signals so that the total power provided to the windings of the AC drive motor remains constant. Likewise, when the DC bus voltage increases, the PWM signal generator decreases the duty cycle of the PWM control signals so that the total power provided to the windings of the AC drive motor remain constant despite fluctuations in line voltage or in the load applied to the motor.

A further feature of the preferred embodiment of the present invention relates to the use of a current sensing module which continuously monitors the high side current to each of the three motor phases. This module senses each phase current to provide protection in the event of a single fault condition as well as to provide redundancy and commonality for the operation of each phase. The preferred embodiment of this invention includes two current sense circuits to provide protection in the event that either of two types of faults occur.

It is an object of the invention to provide an AC drive motor controller system that provides a constant torque profile to the AC drive motor despite variations in the line voltage that drives the system and motor.

It is another object of the invention to provide an AC drive motor controller system that provides a constant torque profile to the AC drive motor despite variations in the load placed on the AC drive motor.

It is another object of the invention to provide an AC drive motor controller system that adjusts the torque profile to the AC drive motor in response to variations in the line voltage that drives the system and in response to variations in the load placed on the motor.

It is yet another object of the invention to provide an AC drive motor controller system that readily adapts to varying line frequencies.

It is yet another object of the invention to provide an AC drive motor controller system that protects against both short term and long term over current situations to prevent damage to the motor and the control system.

It is a further object of the invention to provide an AC drive motor controller system that is inexpensive to manufacture and is reliable in use.

These and other objects of the invention will be clear from the description of the invention given herein and more particularly with reference to the following detailed description of the invention and with reference to the accompanying drawings. Throughout the description, like reference numbers refer to like elements.

DETAILED DESCRIPTION OF THE INVENTION

Figure 1:
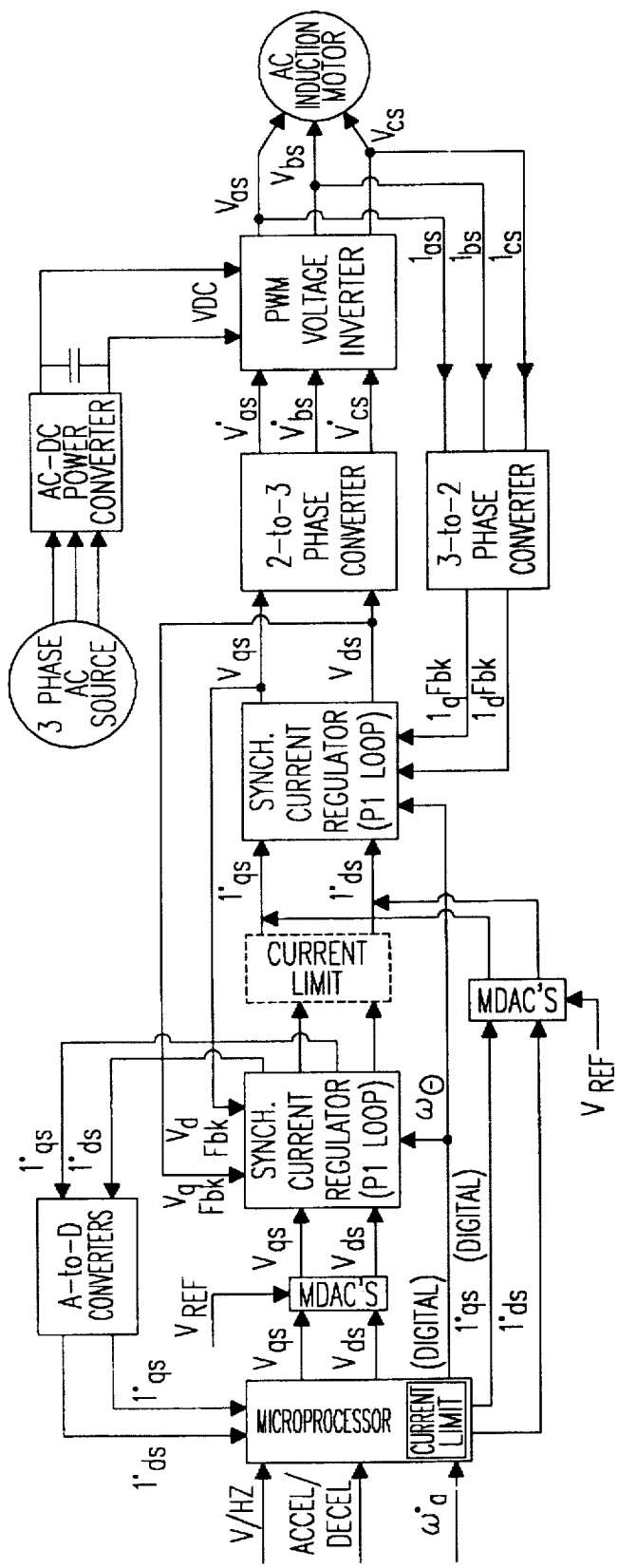
FIG. 1 is a schematic drawing of a prior art pulse width modulated powered AC drive motor system.

FIG. 1 shows the prior art circuit diagram of the system disclosed in U.S. Pat. No. 5,140,248 granted to Rowan et al. As shown in FIG. 1 and described above, the prior art system includes a phase current regulator which is an analog circuit. Further embodiments of the prior art system include an AC or DC power supply regulators which are carried out in an electronic regulator circuit. In the device disclosed in the Rowan et al patent, the current of each phase is measured and the output current is kept constant to the motor accommodate fixed loads.

FIGS. 2 to 15 show the currently preferred embodiment of a treadmill AC drive motor system for use with the present invention. Although the present invention is described below with respect to the preferred use of the present invention in combination with a treadmill, it is anticipated that the present invention may be used with various drive motor systems where it is desirable to provide a constant torque profile to the AC motor despite variable loads and line voltage.

The variable speed drive of the present invention is preferably a microprocessor based, three phase, AC motor controller. The main function of the variable speed drive is to drive an AC motor that in the preferred embodiment drives the walk belt of the treadmill. As described in more detail below, the present invention generally utilizes sine wave outputs which are synthesized by a variable speed drive using pulse width modulators and high current transistor switches. The pulse width modulation signals vary in duty cycle to effectively change the sine wave frequency and voltage levels. As a result of the regulated and controlled frequency and voltage levels, the rotation of the motor shaft and therefore, the speed of rotation of the walk belt is controlled. Although the majority of the circuitry on the variable speed drive supports the AC drive motor function, other sections control the grade system and provide for communication with a remote controller as briefly described below.

Figure 2:
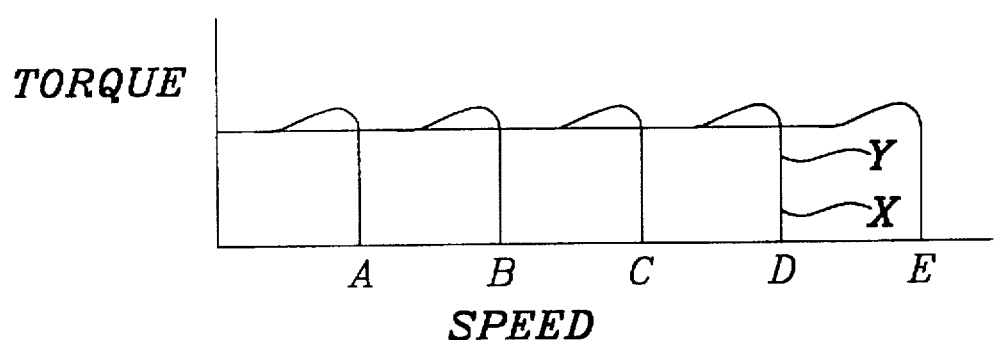
FIG. 2 is illustrative of the preferred form of the torque vs speed profile of the present invention.

FIG. 2 is illustrative of the preferred torque profile of the present invention at various speeds. As shown, for any given speed of the treadmill, the torque profile to the AC drive motor is constant despite varying loads placed on the motor. For example, location X represents the speed of the treadmill when the torque applied to the motor is low, such as when the user is in between strides or as they are pushing off of the treadmill deck. Location Y is illustrative of the situation when the user first plants their foot on the treadmill deck to cause a footfall as described above. As shown, the present invention maintains the speed of the treadmill constant during the normal range of operating speeds and resistance as shown by locations X and Y which are illustrative of the generally perpendicular torque profile of the present invention.

Figure 3:
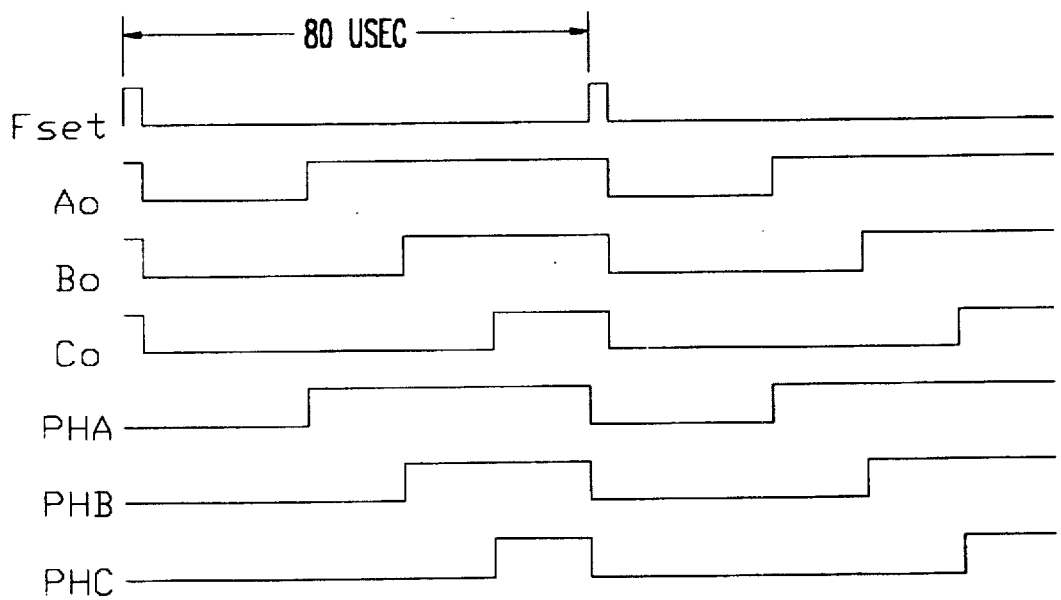
FIG. 3 is illustrative of the PWM logic functional timing of the present invention.

FIG. 3 is illustrative of the PWM logic functional timing with the microprocessor module 20 of the present invention. The signals shown in FIG. 3 are representative of the signals shown in FIGS. 4 and 8. The Fset signal is preferably a 7 microsecond pulse that marks the beginning of a 80 microsecond PWM cycle as described in more detail below. When the Fset signal is active, all of the low side H bridge transistors are turned on. When the Fset signal is inactive, the PhaseA, PhaseB and PhaseC PWM signals are enabled by the gating logic described below. When the Fset signal is reasserted, the software of the microprocessor module 20 loads the other event processor array (EPA) compare logic for that period. The Ao, Bo and Co signals originate from the EPA which is an internal logic block that is based on programmable timers. The EPA is configured by the software to operate in a high speed PWM mode so that each PWM channel is modified in real time to satisfy the current requirements of the variable speed drive system.

Figure 4:
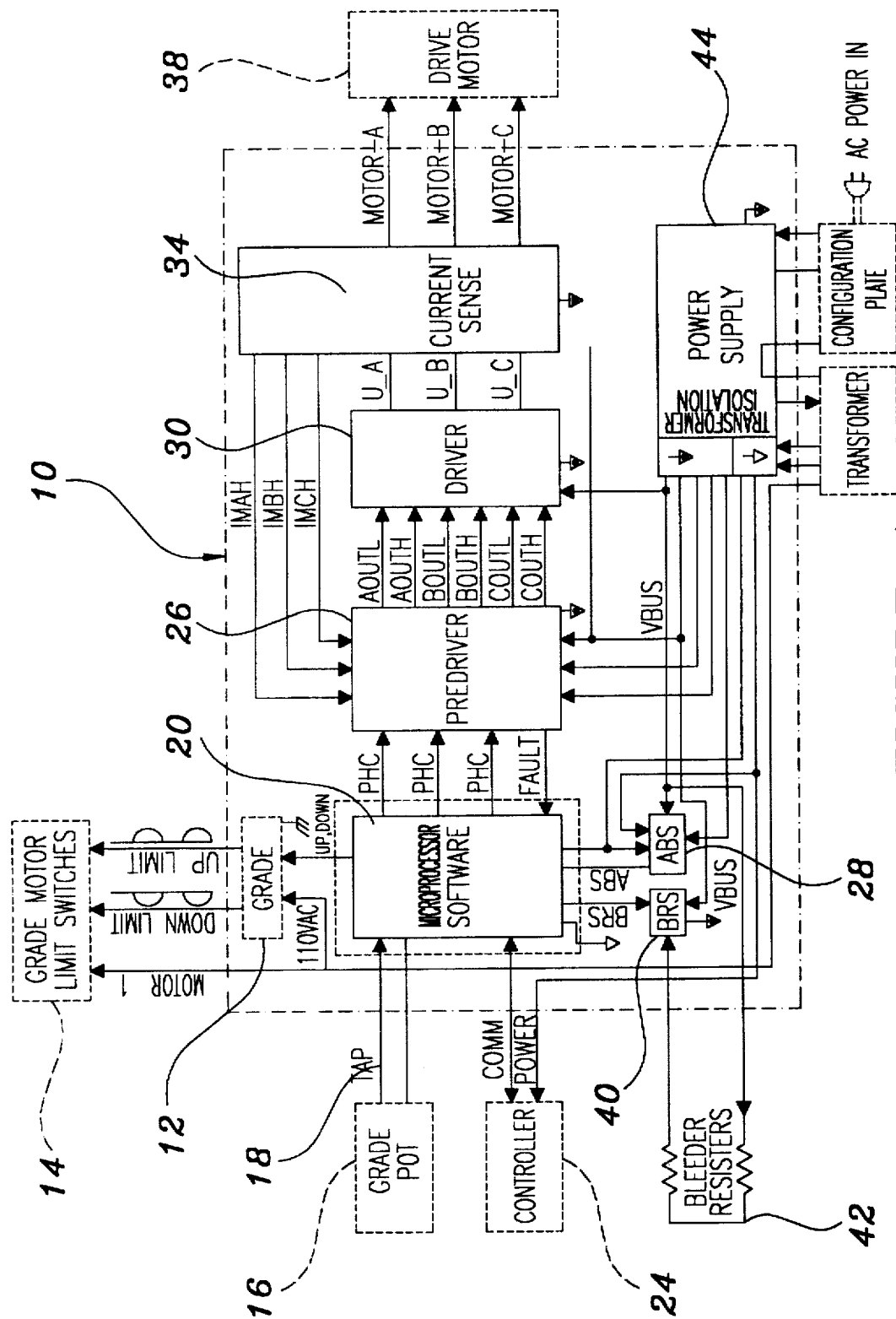
FIG. 4 is a schematic drawing of the preferred form of the PCBA architecture for the variable speed drive system of the present invention.

As shown in the system diagram of FIG. 4, the variable speed drive system 10 of the present invention includes a grade module 12. The grade module 12 contains the electronics for switching and rectifying the voltage used in driving a DC grade motor 14. The grade motor 14 increases or decreases the angle or slope of the treadmill deck according to the signals received from the grade module 12. The grade electronics provide either a positive or negative voltage to the grade motor 14 with each polarity causing the motor to turn in an opposite direction. Feedback for determining the slope of the treadmill deck is provided by a potentiometer mounted to a rack gear (not shown). As the treadmill deck moves up and down, the grade pot 16 turns with it. A voltage is applied across the grade pot 16 and the voltage at a tap point on the potentiometer is measured and received by the microprocessor module 20 as a tap signal 18. The grade of the treadmill deck is proportional to the voltage measured at the tap point and the microprocessor module 20 sends up or down PWM signals to the grade module 12 in response to the tap signal 18 to turn the grade motor 14 in the appropriate direction.

The variable speed drive system 10 of the present invention also includes the microprocessor module 20 having a microprocessor 22 and software. As shown generally in FIG. 4 and in more detail in FIG. 8, the microprocessor 22 communicates with the external treadmill controller module 24, sends pulse width modulated signals to the predriver module 26 and monitors various system parameters as described more fully below. In the preferred form of the present invention, the microprocessor 22 includes a communications link to the treadmill controller module 24 which preferably includes an RS422 serial link in the preferred form of the present invention. As described more fully below, the microprocessor module 20 receives a signal, shown as ABS in FIG. 4, from the adaptive bus scaling system module 28 of the present invention. This signal is preferably between about 0 to 5 volts DC and is proportional to the bus voltage as described more fully below. The microprocessor module 20 also receives fault signals from the predriver module 26 which indicate that a fault has occurred in the driver module 30 or the predriver module 26. As will be described more fully below, the fault signals referred to herein include cross conduction errors, various short circuits and overloads.

Figure 12:
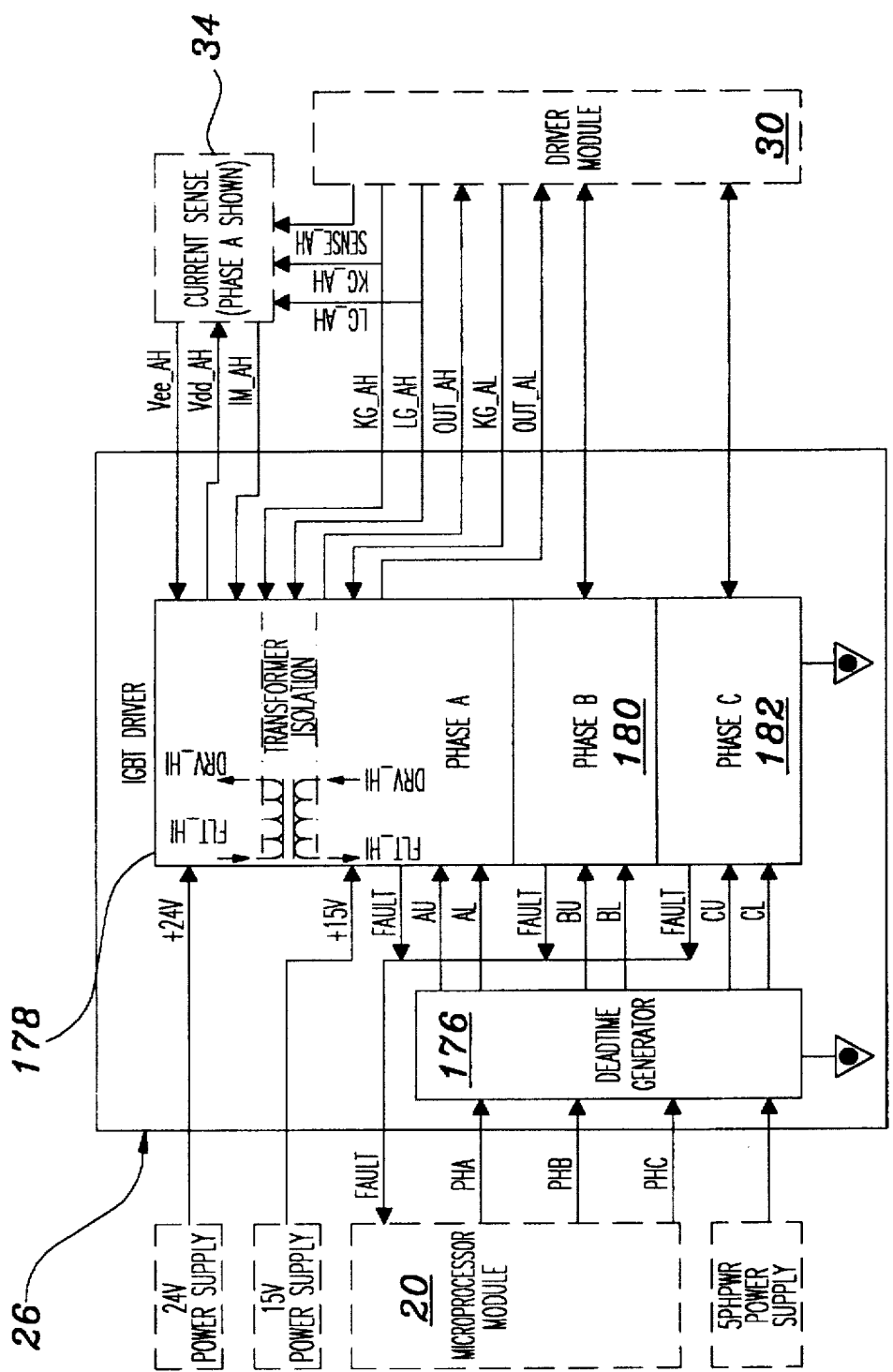
FIG. 12 is a schematic drawing of the predriver module of the present invention.

As shown generally in FIG. 4 and in more detail in FIG. 12, the predriver module 26 receives the pulse width modulated signals from the microprocessor module 20. These signals are shown as PHA, PHB and PHC in FIGS. 3 and 4. As described more fully below, the predriver module 26 converts the PWM signals into high and low gate drive signals for the power insulated gate bipolar transistors (IGBT) 32 in the predriver module 26. The predriver module 26 also receives over current signals for each phase from the current sense module 34. These signals are shown as IMAH for phase A, IMBH for phase B and IMCH for phase C in FIG. 4. The predriver module 26 sends high and low gate drive signals to the driver module 30. These signals are shown as AOUTH and AOUTL for phase A, BOUTH and BOUTL for phase B and COUTH and COUTL for phase C in FIG. 4.

Figure 10:
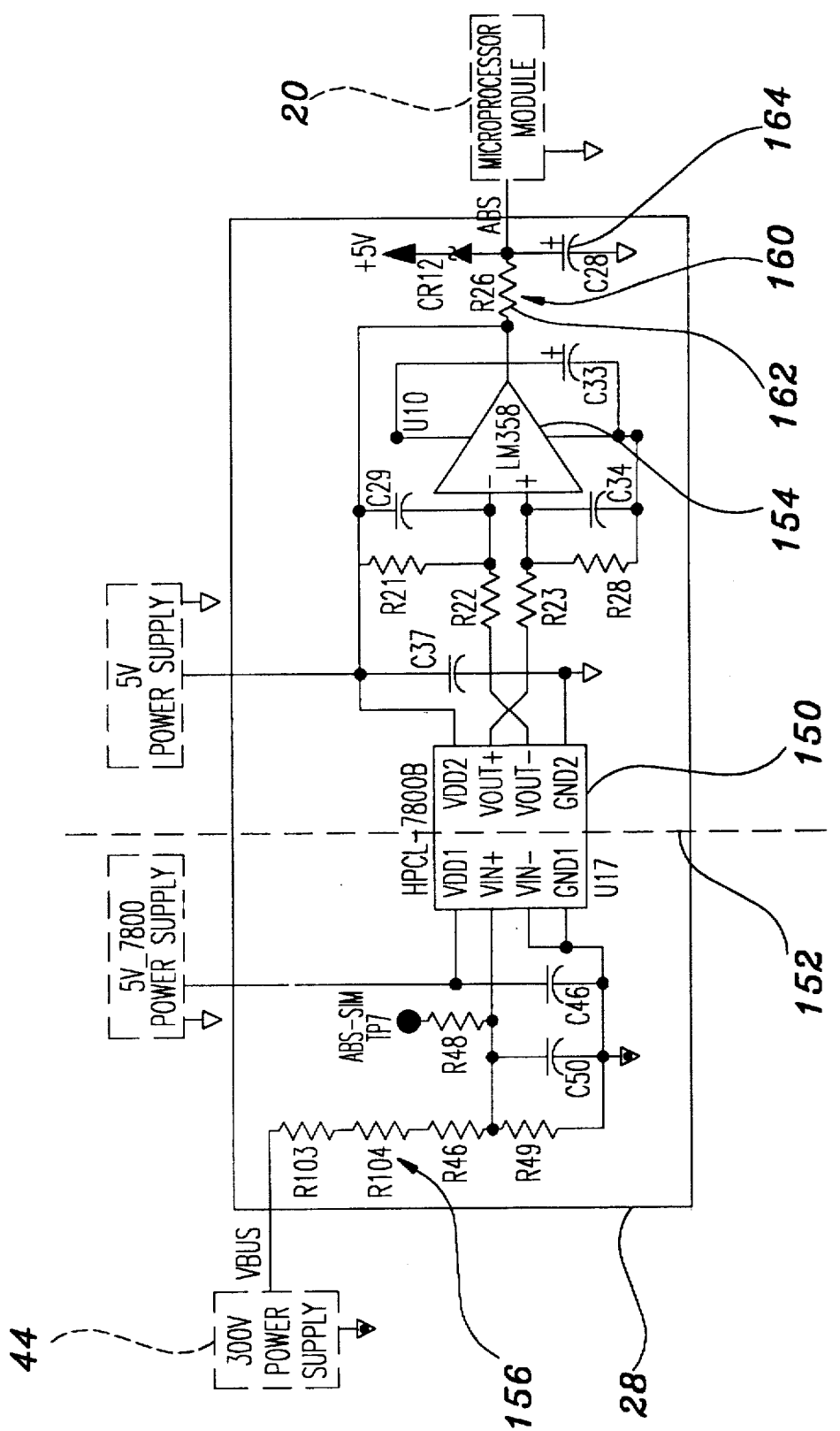
FIG. 10 is a block diagram of the adaptive bus scaling system of the present invention.

The ABS system module 28 of the present invention is shown generally in FIG. 4 and in more detail in FIG. 10. As described more fully below, the ABS system module 28 generates an isolated low voltage signal which is proportional to the 300 volt bus. This signal is shown in FIG. 4 as ABS and is passed to the microprocessor module 20 for digitization and monitoring as described more fully below.

Figure 13:
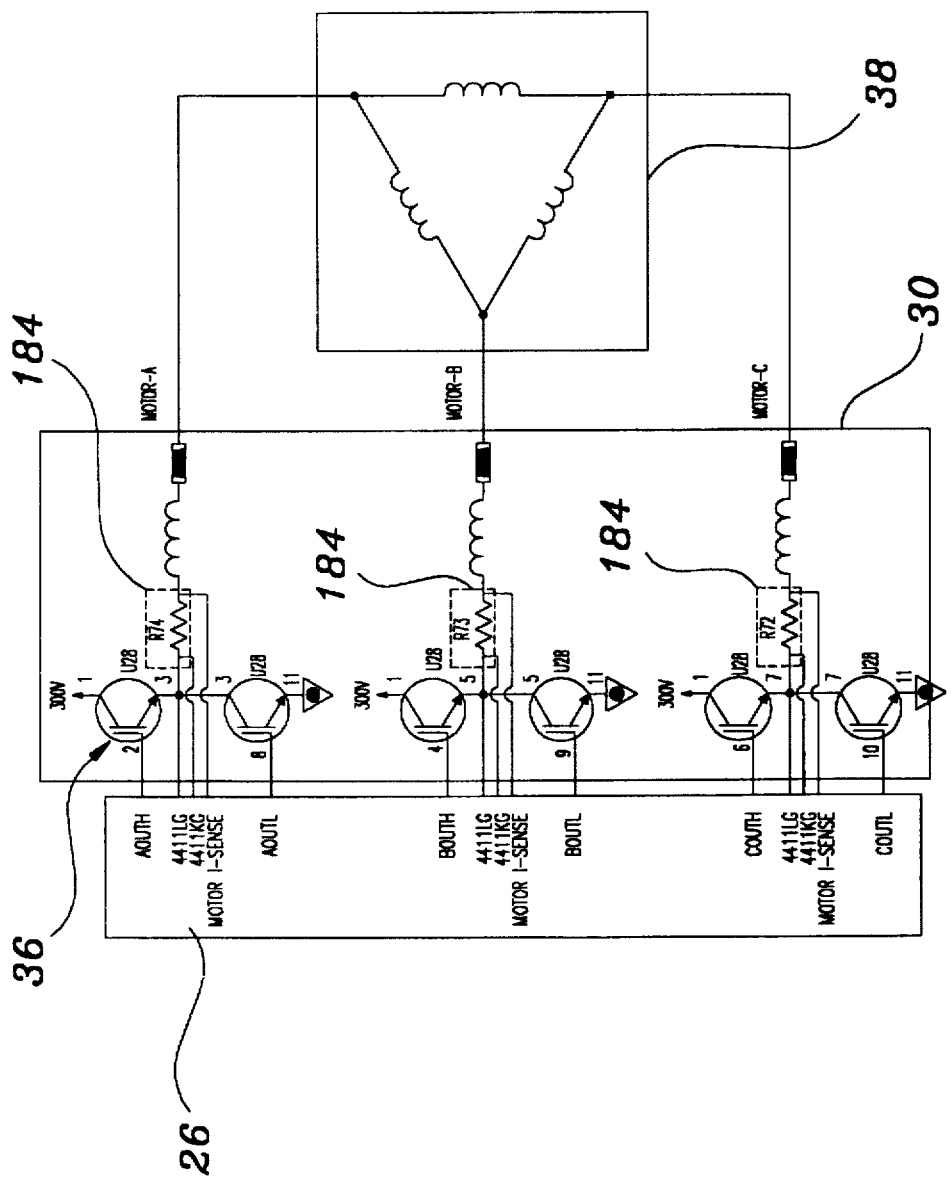
FIG. 13 is a schematic drawing of the driver module of the present invention.

The driver module 30 of the present invention is shown generally in FIG. 4 and in more detail in FIG. 13. The driver module 30 preferably includes IGBT drivers which include six insulated gate bipolar transistors (IGBT) which are configured as 3 "H" bridges. The driver module 30 is preferably self contained and includes transistors and protection diodes mounted and potted together. The driver module 30 receives the high and low gate drive signals from the predriver module 24 to turn the IGBT switches on and off.

Figure 15:
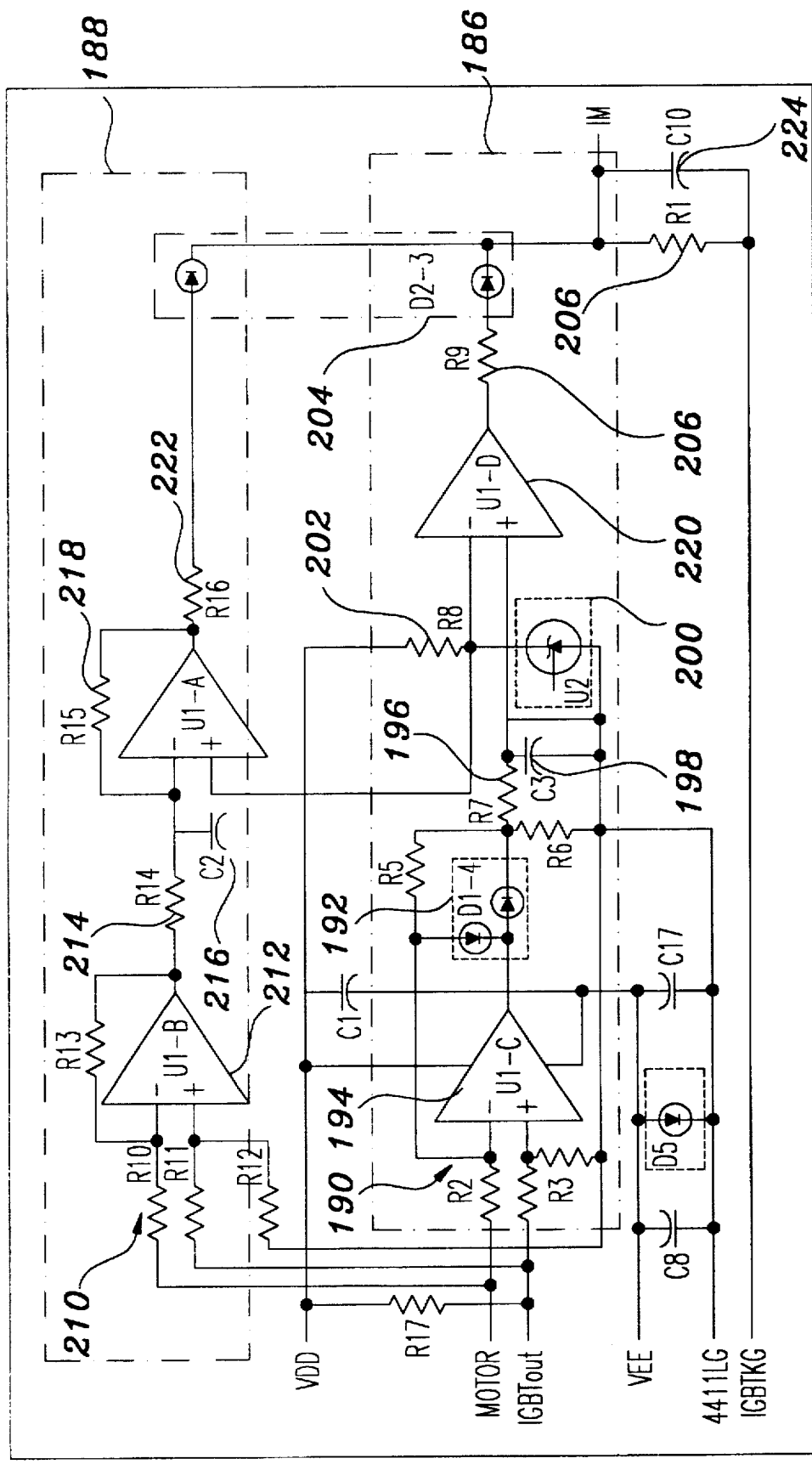
FIG. 15 is a schematic drawing of the current sense module of the present invention.

As shown in FIGS. 4 and 15, the current sense module 34 of the present invention monitors the current of each of the three phase wires on their way to the drive motor 38. These signals are shown in FIG. 4 as U A, U_B and U_C and represent the high current three phase motor signals between the driver module 30 and the drive motor 38. As described more fully below, if a threshold is reached by the high current three phase motor signals, a fault is sent back to the predriver module 26 to shut down the appropriate IGBT for the rest of that cycle and to the microprocessor module 20 and the controller module 24. If further over current faults are generated by the current sense module 34, the microprocessor module 20 will shut the variable speed drive system 10 down.

As shown in FIG. 4, the microprocessor module 20 also sends a BRS signal to the bus recovery system (BRS) module 40 which is in communication with a plurality of bleeder resistors 42. The BRS module 40 is shown in more detail in FIG. 11 and provides protection for the drive circuitry when the treadmill is at a grade which exceeds a predetermined level such as 15%. In this situation, the user may begin to "drive" the walk belt which in turn drives the drive motor 38. This may occur because, as the drive motor 38 is driven by the user, the drive motor 38 may act like a generator and build up excess energy. If this were to occur and the 300 V bus exceeded the maximum voltage requirement, the controller module 24 would shut down the microprocessor module 20 otherwise, the components in the drive circuitry would be exposed to voltages in excess of their maximum ratings. To prevent this from occurring, the BRS module 40 includes the bleeder resistors 42 which are designed to bleed off the excess energy from the 300 V bus so that the excess energy is dissipated prior to causing any damage in the microprocessor module 20.

Figure 14:
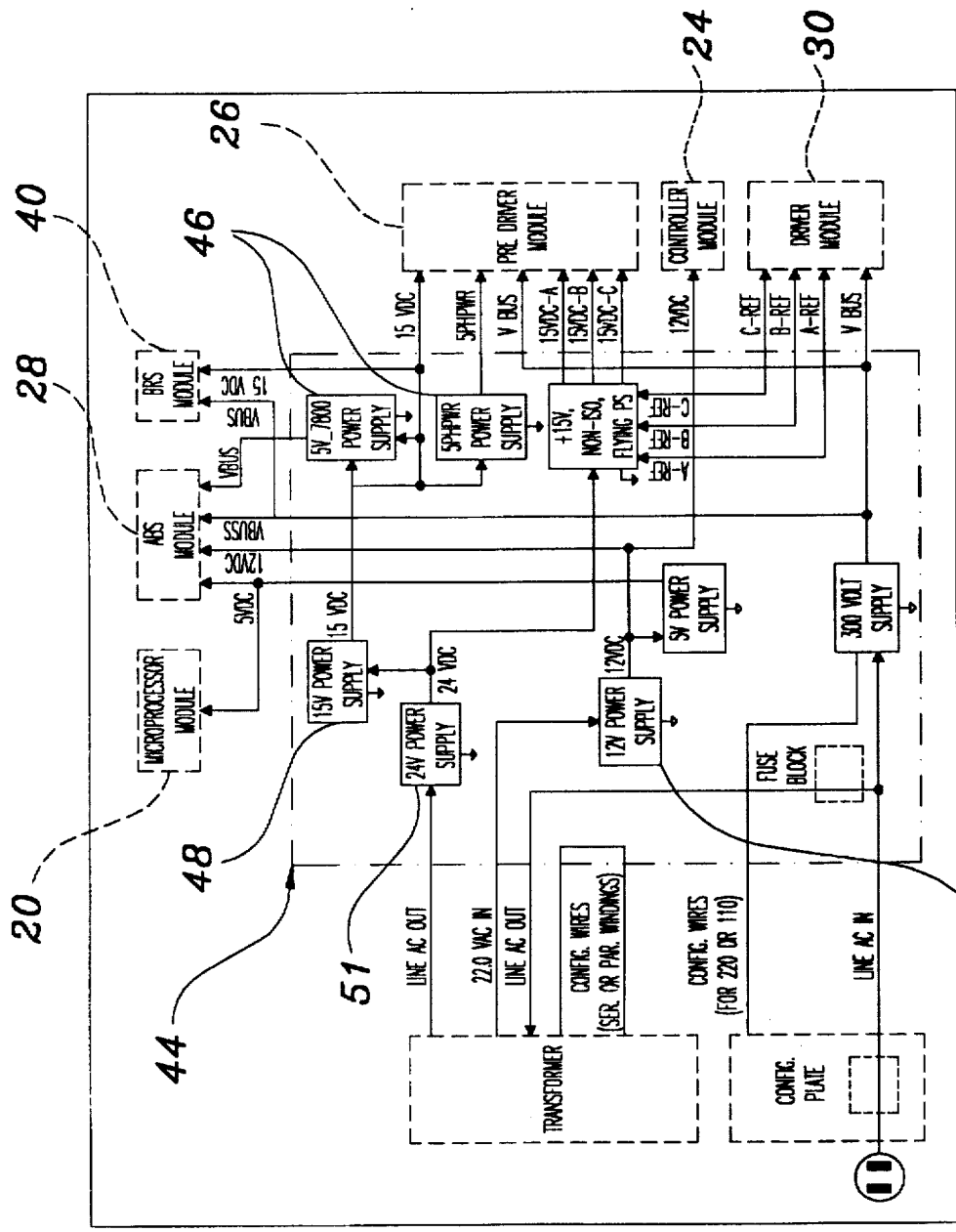
FIG. 14 is a schematic drawing of the power supply module of the present invention.

As shown generally in FIG. 4 and in more detail in FIG. 14, the power supply module 44 of the preferred form of the present invention includes two switching regulators, 50 and 51, to generate low voltage supplies of +12 V, isolated, and +24 V, non-isolated, respectively. The +12 V supply provides power for the ABS module 28 and the controller module 24. Additionally, a linear regulator generates an isolated low voltage of +5 VDC from the +12 V supply to provide operating power for the microprocessor control circuitry. The +24 V supply is used to provide non-isolated input for six linear regulators. Four of these regulators supply +15 V for the IGBT drivers. One 15 V regulator supplies all three low side drivers (15 V power supply). Each high-side driver has its own 15 V regulator (+15 V, non-isolated, flying power supply) since the ground reference for each circuit "flies" to the buss voltage independently. The other two linear regulators provide non-isolated +5 V (5PHPWR) for the predriver module 26 (deadtime generator circuit) and (5 V_7800) for the ABS module 28. The 300 VDC is supplied as a high voltage, high current supply for the driver module 30 which is then supplied to the drive motor 38 and monitored by the ABS module 28 and the bleeder resistors 42.

Figure 5:
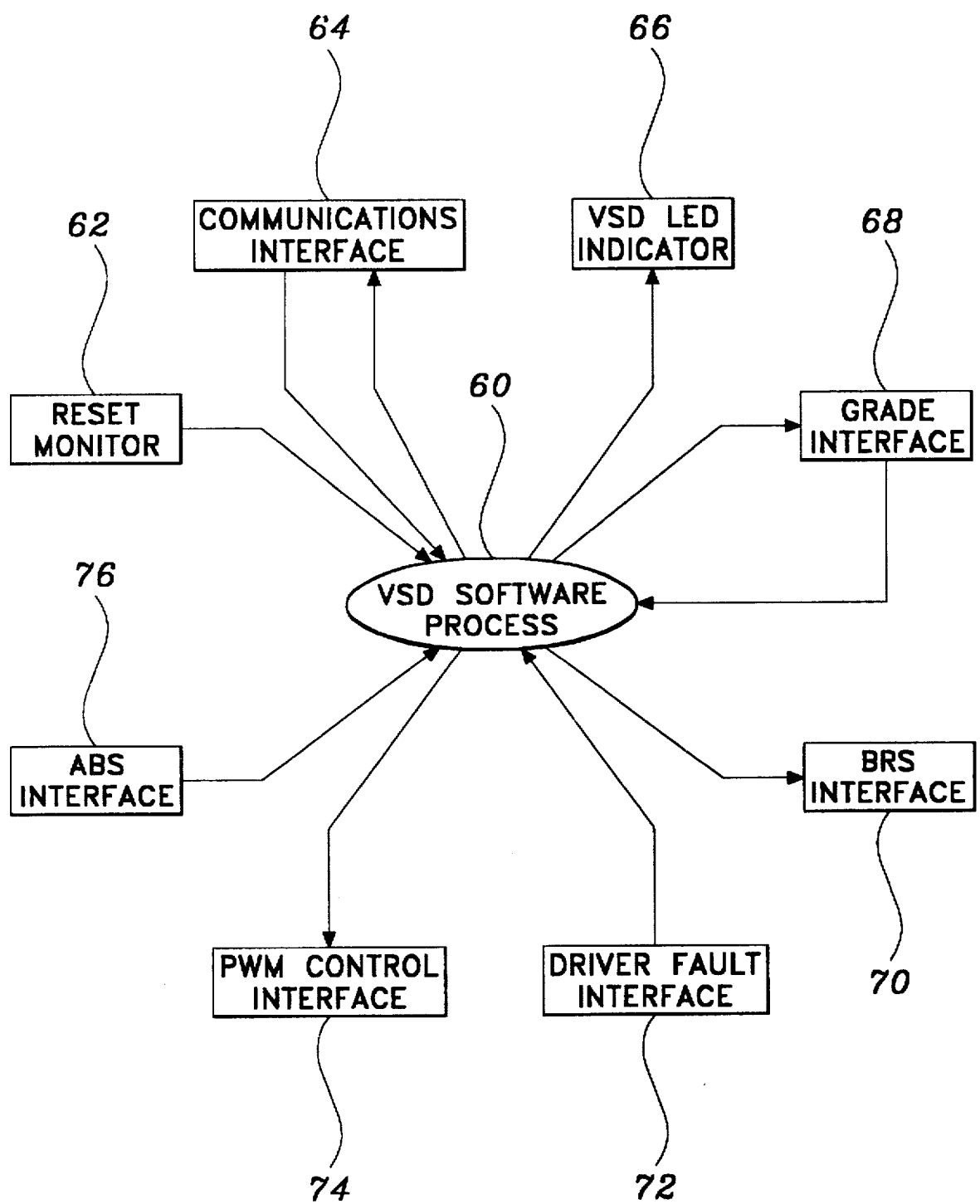
FIG. 5 is a data flow drawing of the software configuration of the peripheral signal interface of the variable speed drive system of the present invention.

FIG. 5 is illustrative of the peripheral interfaces to the variable speed drive software module 60 of a preferred form of the present invention. The following is intended to provide an illustrative description of the general operating environment of the preferred form of the present invention without limiting the present invention to the specific embodiment described herein. As shown in FIG. 5, one of the interfaces is a reset monitor 62. The reset monitor 62 is preferably an external reset monitor device (not shown) which provides the variable speed drive software module 60 with an external reset signal. When a reset signal is detected, a self test process is performed. If an error is detected, a self test error detect message is sent to an error handling process in the software module 60. If no errors are found in the self test, an initialize variable speed drive message is sent to the initialization process of the software module 60 and the variable speed drive is initialized for normal operation. If no errors are found during initialization, a start up variable speed drive message is sent to the background control process where it starts up the real time executive for real time processing. If a time out occurs in any process, a reset message is sent to the self test process where the system is reset and initialized. The background control process controls and sequences all non-time critical tasks while the real time executive controls and sequences all time critical tasks. Control is passed between the background and real time control processes via two messaging paths with the real time task message having the highest absolute priority. Control is returned to the background control process via a background task message when all real time tasks are completed.

The next interface shown in FIG. 5 is the communications interface 64. The control flows originate from an external communications interface module such as an external RS-422 module and provide the software module 60 with transmit and receive capabilities. The purpose of the communications interface is to allow a host controller, such as the controller module 24 shown in FIG. 4, to send command packets and receive status and control information from the software module 60.

Another interface shown in FIG. 5 is a variable speed drive LED indicator 66. The data flow path of the LED indicator 66 provides self test flash codes and provides an indication of a start enabled condition for service personnel. After a self test is completed and an error is located that indicates that communications cannot be established, the LED will flash. If no errors are found and communications are able to be established, the LED will remain off.

Another interface shown in FIG. 5 is the grade interface 68. The grade interface 68 allows the software module 60 to interface with the elevation system of the treadmill which controls the grade or angle of the deck of the treadmill. The grade and feedback control signal is sampled and filtered by an A to D control process as described more fully below. The A to D process samples the grade feedback voltage and then filters and grades the result. Once ready, the new feedback level is stored in a buffer. The background control process is responsible for generating all control and pulse width modulation responses necessary for proper grade operation by using both current and target grade parameters to determine when a grade change is necessary.

Another interface shown in FIG. 5 is the buss recovery signal (BRS) interface 70. The buss recovery signal interface 70 is used to switch a power resistor on when the buss voltage exceeds a predetermined level. The background control process periodically sends a check message to the buss signal interface 70 for the buss signal interface 70 to sample the adaptive buss scaling voltage and if the voltage exceeds a predetermined level the power resistor is turned on and the voltage is switched to the bleeder resistors 42 until the voltage decreases to a safe level.

Another interface shown in FIG. 5 is the drive fault interface 72. The driver fault interface 72 is responsible for detecting and responding to driver fault event signals. In the event of a valid over current situation, the fault status checking process of the driver default interface 72 signals the software module 60 to stop the pulse width modulation process to disable all pulse width modulation signaling and sends a message to the LED indicator module 66 and the host remote control unit.

Another interface shown in FIG. 5 is the pulse width modulation control interface 74. The pulse width modulation control interface provides the software module 60 with pulse width modulation, timing and output control signals and is shown in more detail in FIG. 7. This process monitors current and requested speed and updates all pulse width modulation control parameters.

Another interface shown in FIG. 5 is the adaptive buss scaling interface 76. The adaptive buss scaling module 28 is shown in more detail in FIG. 10. The adaptive buss scaling interface 76 provides the variable speed drive system 10 with the adaptive buss scaling voltage that allows the pulse width modulation control interface 74 and the buss recovery interface 70 to gain access to a filtered representation of the buss voltage. The A to D process converts a 0 to 5 b 57475246.001 volt analog input into an 8 bit integer where it is then filtered. The result is then placed into an adaptive buss voltage register for use by the pulse width modulation control interface 74 and buss recovery system interface 70.

Figure 6:
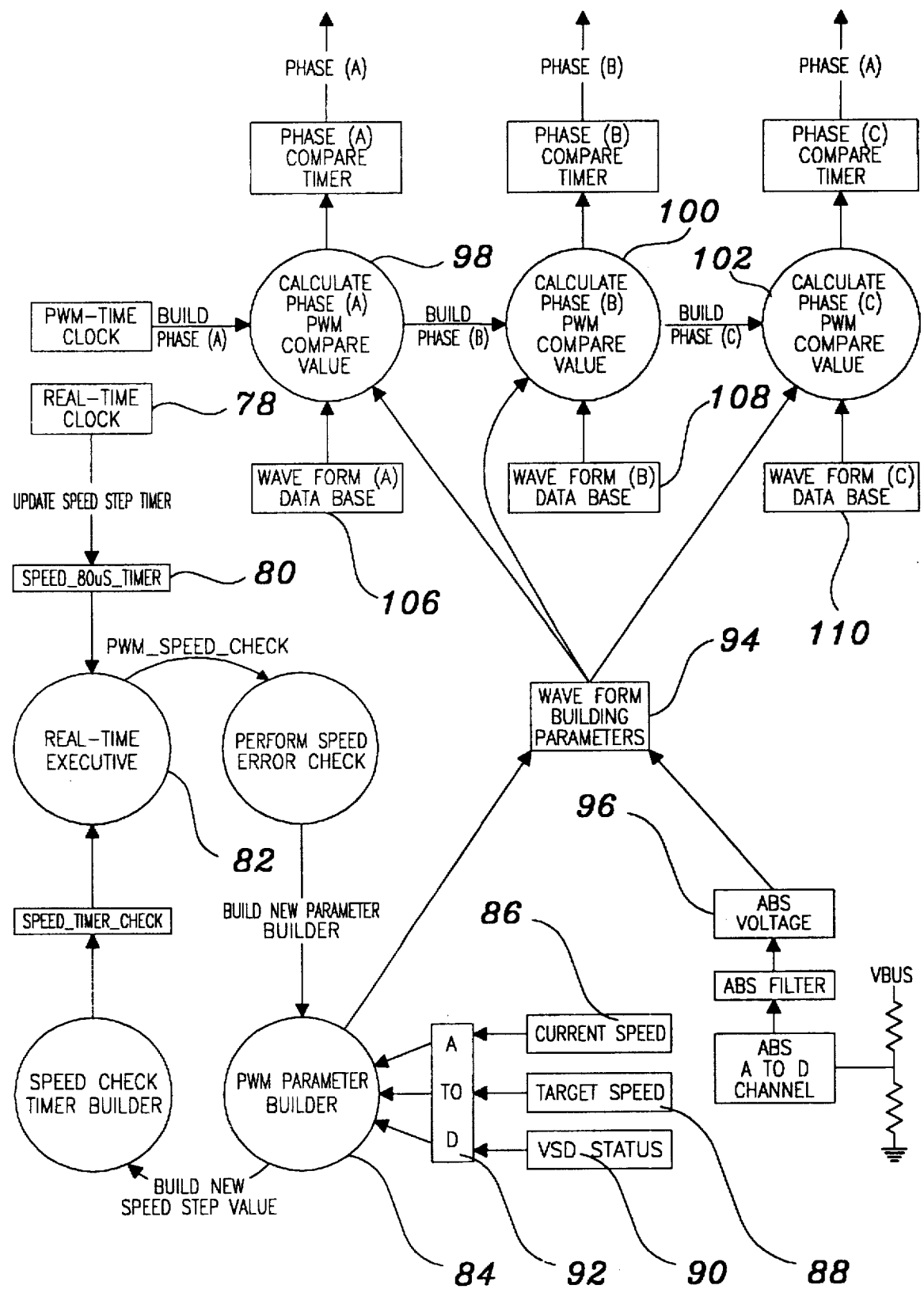
FIG. 6 is a data flow drawing of the software configuration of the pulse width modulated speed control system of the present invention.
Figure 7:
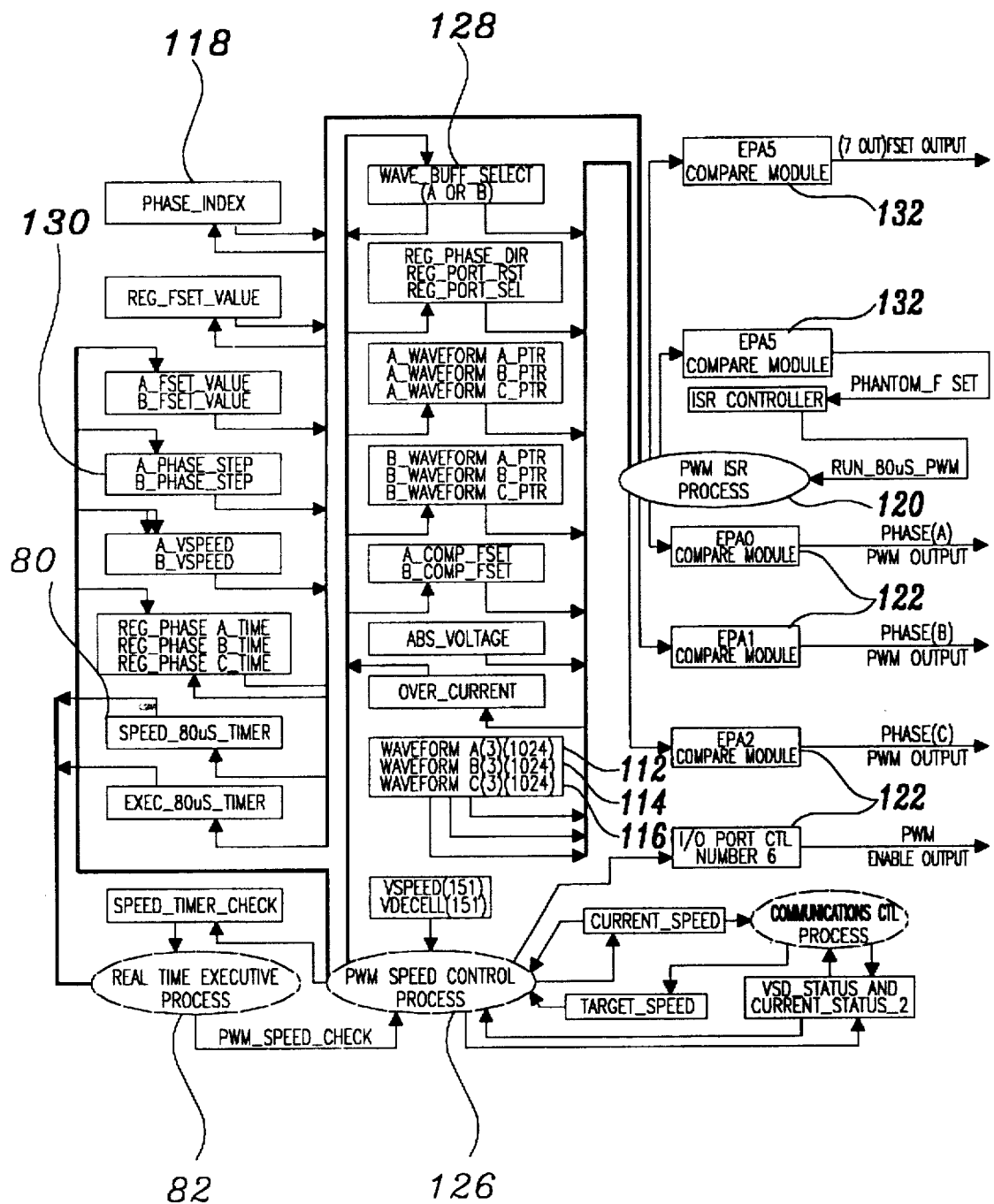
FIG. 7 is a functional drawing of the software configuration of the pulse width modulated speed control system of the present invention.

The microprocessor module 20 operates in part according to a software controlled state machine. FIG. 6 shows the state machine and illustrates the pulse width modulation speed control process. FIG. 7 illustrates the overall PWM control process in further detail. A real-time clock 78 is connected to 80 μsecond timer 80. The 80 μsecond timer 80 sends an interrupt every 80 μseconds to a real-time executive 82. The interrupt "wakes up" real-time executive 82 and directs real-time executive 82 to initiate the software module called pulse width modulation (PWM) parameter builder 84.

The PWM parameter builder 84 constantly senses parameters of the treadmill belt system through sensors 86, 88 and 90. The sensors 86, 88 and 90 measure the speed and status parameters of the system of interest in determining the pulse width modulation signal sent to the drive motor 38. The sensors 86, 88 and 90 are connected to PWM parameter builder 84 through an A-to-D converter 92. As a result of the interrupt generated by 80 μsecond timer 80, the PWM parameter builder 84 samples and stores the parameters of the system of interest every 80 μseconds.

The parameters of the system of interest in determining the PWM signal sent to the drive motor 40 are preferably the current speed of the treadmill belt, the target speed of the treadmill belt and the variable speed drive status. The sensors 86, 88 and 90 sense the current speed of the treadmill belt, the target speed of the walk belt and the variable speed drive status, respectively.

The wave form building parameter module 94 is a software module which retrieves the system parameters from PWM parameter builder 84 and the adaptive buss signal voltage register 96. The wave form building parameter module 94 then passes these values to the three PWM signal constructing modules phaseA PWM constructing module 98, phaseB PWM constructing module 100 and phaseC PWM constructing module 102. The phaseA PWM constructing module 98, phaseB PWM constructing module 100 and phaseC PWM constructing module 102 are each connected to a PWM frequency reference generator or event processor array (EPA) 132 as shown in FIG. 7. The EPA 132 provides the reference signal that determines the frequency of the individual pulses of the PWM signal. In the preferred embodiment, the PWM cycle time can range from about 80 μsecond to 500 μsecond but is preferably set for a cycle time of approximately 80 μseconds.

Each PWM constructing module 98, 100 and 102 is connected to the wave formA data base 106, wave formB data base 108 and wave formC data base 110. Each data base contains sine, saturated and supersaturated wave form information. The term "Saturated" as used herein is intended to mean that the absolute value of the amplitudes of the waveform is larger than the corresponding absolute value of the amplitudes for a sine wave. The term "Supersaturated" as used herein is intended to mean that the absolute value of the amplitudes of the waveform is larger than the corresponding absolute value of the amplitudes for a "saturated" sine wave. The wave form data bases 106, 108 and 110 are preferably memory registers containing "words" that digitally represent different shaped waveforms. In the preferred embodiment, the wave formA data base 106 contains the data to produce a wave form for Phase A. The wave formB data base 108 contains the data to produce a wave form for Phase B. The wave formC data base 110 contains the data that produces a wave form for Phase C.

The PWM constructing modules 98, 100 and 102 use the system parameters presented the from wave form building parameter 94 and the data contained in the wave form data bases 106, 108 and 110 along with the timing signal from EPA 132, to produce three PWM signals.

The PhaseA PWM constructing module 98 provides the PWM Output signals that drive coil(A) of the three-phase AC drive motor 30 based on the following equation:

$$PWM\ Phase(A)=(Vm/ABS)\times Sin[wt]$$

where Vm is buss voltage.

The PhaseB PWM constructing module 100 provides the PWM Output signal that drives coil(B) of the three-phase AC drive motor 38 based on the following equation:

$$PWM\ Phase(B)=(Vm/ABS)\times Sin[wt\text{-}120°].$$

Where the phrase "wt-120" means that the varying sine wave sin(wt) that varies with time is phase shifted by 120°.

The PhaseC PWM constructing module 102 provides the PWM Output signal that drives coil(C) of the three-phase AC drive motor 38 based on the following equation:

$$PWM\ Phase(C)=(Vm/ABS)\times Sin[wt\text{-}240°].$$

Where the phrase "wt-240" means that the varying sine wave sin(wt) that varies with time is phase shifted by 240°.

As a result of the output from the phase constructing modules 98, 100 and 102, three PWM signals are produced that differ from each other only in the phase of the PWM signal.

FIG. 7 shows a high level data flow diagram for the software operation of the PWM Control Process that is carried out in the microprocessor module 20. The microprocessor module 20 contains a number of registers. Three of these registers are called WaveformA, WaveformB and WaveformC registers identified as 112, 114 and 116, respectively.

Another register is called the Phase Index register 118. The Phase Index register 118 contains information about the phase position of the waveforms contained in registers WaveformA, WaveformB and WaveformC.

The PWM interrupt service routine (ISR) Process 120 controls the PWM drivers 122. The PWM ISR Process 120 produces pulses having a width determined according to the following equations:

Phase A width=Fset_time*[0.58-%Flux(Vspeed)]*[Vbuss/ABS_voltage]*satsine(wt).

Phase A width=Fset_time*[0.58-%Flux(Vspeed)]*[Vbuss/ABS_voltage]*satsine(wt-120°).

Phase A width=Fset_time*[0.58-%Flux(Vspeed)]*[Vbuss/ABS_voltage]*satsine(wt-240°).

The resulting PWM signals produce synthetic sine waves having frequencies ranging from 0 to 120 Hz.

As shown in FIG. 7, the PWM control process is essentially a data base of wave forms so that the phase index register 118 is used by the PWM ISR process 120 every 80 microseconds through an 80 μsecond timer 80 which is set up to read all of the registers and produce three PWM signals every 80 μseconds. In the present invention, a double buffered system is preferably used to call either the A or B buffers of data at the request of the real time executive 82 to enable the PWM ISR process 120 to build the next point of the three wave forms. With a double buffered system, one set of buffers is updated while the PWM ISR process 120 is reviewing the other set of buffers. When the PWM speed control process 126 (as shown in FIG. 6) is updated, all of the buffers are updated with a switch called the wave buffer select 128. The PWM speed control process 126 is called by the real time executive process 80 and has the ability to select its own call back rate so that as speed is increased or decreased, the call back rate of the PWM speed control process 126 may be increased or decreased. This allows the treadmill to use what are called "soft" starts where the speed of the walk belt is gradually increased irrespective of the initial speed selected by the controller module 24. Otherwise the walk belt may start abruptly at the speed selected by the user or controller module 24 without a gradual increase in speed. This abrupt type of speed change may potentially startle or injure the user. Similarly, as the speed of the walk belt is decreased, the speed change is preferably gradual rather than an immediate speed change unless an emergency stop or serious fault condition exists where it is desirable to stop the walk belt as quickly as possible.

The phase index register 118 is essentially an index into the wave form data channel to determine the phase position of the three waveforms. Additionally, a phase step register 130 is also used to determine the sampling rate or speed at which the wave form is updated so that at slower speeds a smaller increment is used and, at faster speeds, a larger increment is used by the PWM ISR process 120. The event processor arrays (EPAs) 132 are configured as pulse width modulated channels and are designed to receive the PWM data from the PWM ISR processor 120.

Figure 8:
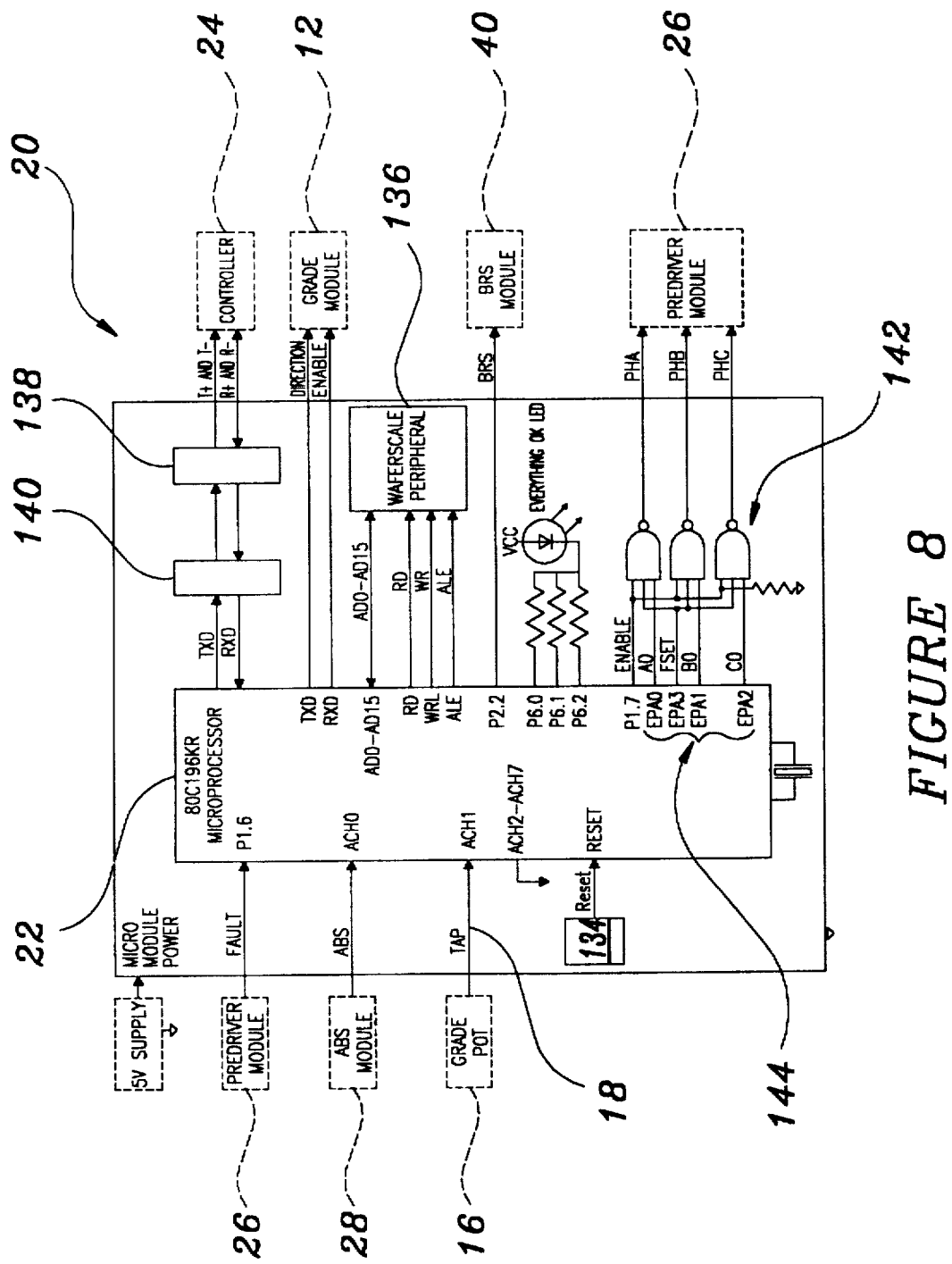
FIG. 8 is a schematic drawing of the microprocessor module of the present invention.

FIG. 8 is a schematic drawing of the modular architecture of the microprocessor module 20. As described above, the microprocessor module 20 generally includes a microcontroller 22 and software where the microcontroller 22 communicates with the controller module 24, sends pulse width modulated signals to the predriver module 26 and monitors various system parameters.

The microcontroller 22 preferably includes a high integration internal controller having a 16 bit central processing unit as a basic core component. A register RAM, an 8 channel A to D converter, a serial I/O port, timers and an event processing array (EPA) surround the CPU and are used to generate the pulse width modulated signals as described above.

As shown in FIG. 8, the microprocessor module 20 receives a signal from the predriver module 26 shown as Fault. This signal is optically isolated and buffered so that the software of the microprocessor module 20 reacts to the receipt of the Fault signal in different ways depending on the current state of the system. The microprocessor module 20 also receives a reset signal from the voltage monitor and reset integrated circuit 134 to return the internal logic of the microprocessor 22 to a known state upon receipt of the signal. The microprocessor module 20 also receives an RXD signal which consists of a serial bit input stream through a suppression circuit 138 and buffer 140 from the controller module 24. The signals shown as AD0–AD15 consist of a micro data buss where data is read from and written to peripherals such as the waferscale microprocessor peripheral 136. The waferscale peripheral 136 contains fixed program memory and static RAM for the microprocessor 22.

These two memories share the same address and data port out of the device and are selected by internal decoding logic. The signals shown as RD and WR are low level signals that indicate the microcontroller 22 is reading or writing data from or to the waferscale peripheral 136. The signal shown as ALE is an address latch enable signal which is used by the peripheral 136 to latch the address from the A/D buss during the appropriate part of the cycle.

The PWM gating logic 142 is the logic which supports the microprocessor event processor array channels 144 shown as EPA0, EPA1, EPA2 and EPA3. Preferably the three EPA channels, EPA1-EPA3, generate a raw PWM signal and the EPA0 channel generates an Fset signal as shown in the drawings. As shown in FIGS. 3 and 8, and described above, the Fset signal marks the beginning of the PWM cycle and is gated with all three PWM signals. The enable signal from the microprocessor 22 to the gating logic 142 enables the PWM signals to transition when active. When the signal is inactive, the PWM signals all go to a high state. Because all of the I/O pins of the processor go to high impedance during reset, a pull down resistor is added to this signal so that the signal stays inactive during reset.

As described above, the Fset signal is preferably a 7 microsecond pulse that marks the beginning of the 80 microsecond PWM cycle. When the Fset is active, all low side transistors are on. When the Fset signal goes inactive for the remainder of the cycle, Phase A, B, and C are enabled by the PWM gating logic 142. During the period that the Fset signal is asserted, the software loads the other EPA compare logic module 132 (FIG. 7) with the PWM information for that period. The signals shown in FIGS. 3, 4 and 8 as A0, B0 and C0 originate from the microprocessor event processor array which is an internal logic block that is based on programmable timers and is configured by the software to operate in a high speed PWM mode. Each PWM channel is modified in real time to satisfy the current requirements of the system.

Figure 9:
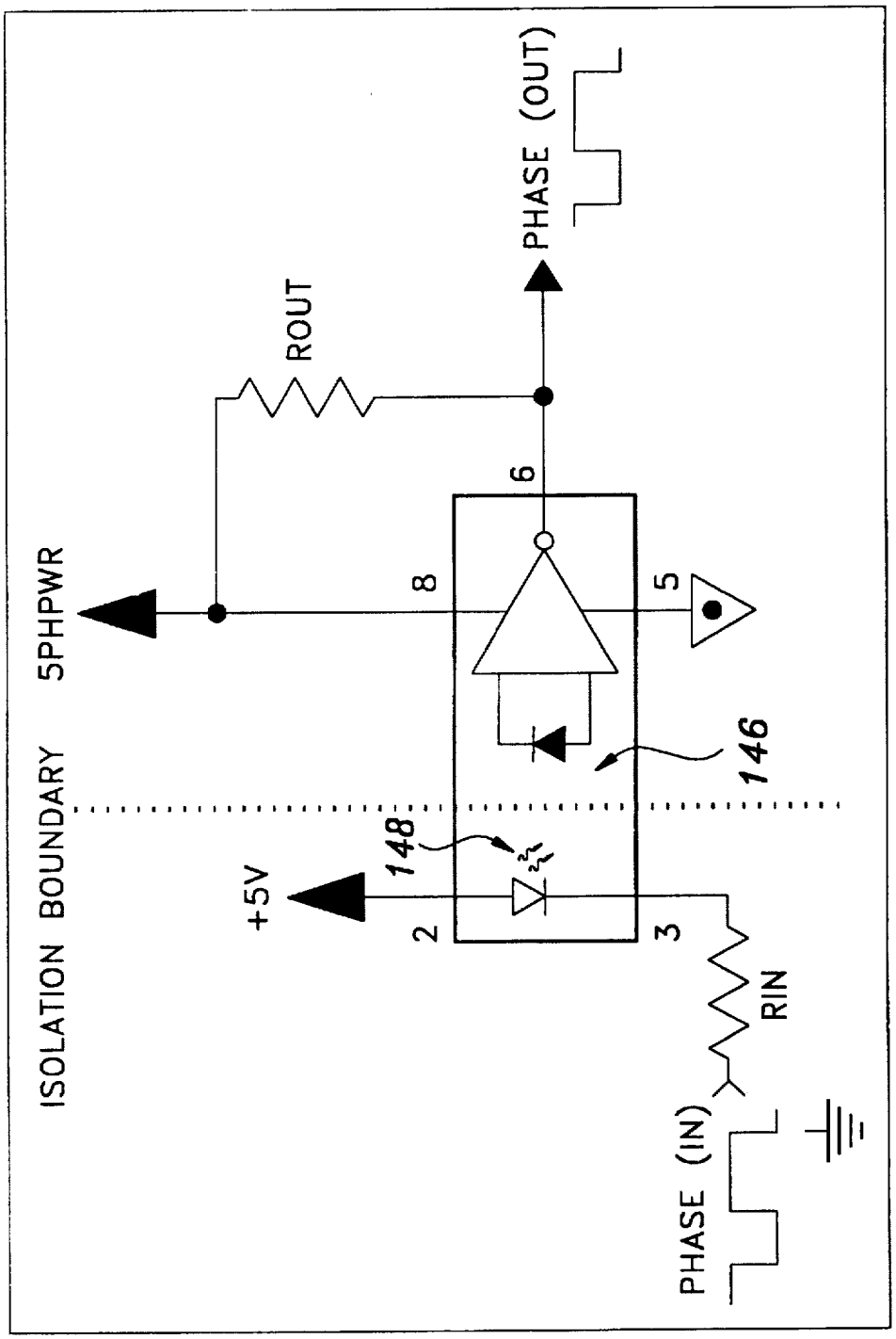
FIG. 9 is a schematic drawing of the optocoupler system of the present invention.

FIG. 9 is illustrative of the optical coupler system 146 of the present invention between the microprocessor module 20 and the predriver module 26. The coupler system 146 provides isolation between the phase input signals and the output phase drive signals and include an interface for the phase input signals shown in FIG. 4 as PHA, PHB and PHC. These phase input signals are derived from the microcontroller 22 and are decided through phase decoding logic. The phase input signals feed optocoupler input lines on the isolated side of the system 146 and require drive levels of approximately +5 V CMOS. The +5 volt isolated input bias power is converted to light energy via an LED emitter 148 in order to cross the isolation boundary. The output signals feed a crossover delay phase splitter system and are preferably non-inverted versions of the phase input signals. The variable speed drive system 10 also includes the fault signal between predriver module 26 and the microprocessor module 20 as shown in FIG. 4. The fault input signal is derived from the predriver module 26 and feeds an optical coupler input line (not shown) on the non-isolated side. The output signal feeds the cross over delay phase splitter system and is a non-inverted version of the input signal. The isolated input bias power is converted to light energy through an LED emitter (not shown) in order to cross the isolation boundary.

FIG. 10 is a schematic diagram of the adaptive buss scaling module (ABS) 28 of the present invention. As described briefly above, the ABS module 28 provides the microprocessor module 20 with an analog voltage signal which is proportional to the voltage of the drive buss. The drive buss is typically 300 volts. An isolation amplifier 150, such as a HCPL 7800 manufactured by Hewlett Packard is used to send the raw data across the optical isolation boundary 152. Once the data is on the microprocessor side of the isolation boundary 152, the differential voltage is filtered and scaled by a differential optical amplifier 154 to provide the appropriate signal level required by the microprocessor module 20.

As shown in FIG. 10, the input to the ABS module 28 is the drive buss (Vbuss). The preferred range of measurement for the ABS module 28 is between about 0 VDC to 600 VDC. The resistors 156 provide the proper scaling for the isolation amplifier 150. The preferred resistors have a maximum voltage rating of 200 V and therefore, three resistors which are preferably of equal value are used to step the voltage down to the isolation amplifier level.

As described more fully below, the drive buss includes two frequency ranges of concern. The first frequency of concern is known as the rectification frequency or twice the line frequency. In the preferred form of the present invention, the rectification frequency is preferably a minimum value of approximately 100 Hz due to the existence of European and Japanese line frequencies of 50 Hz and includes the value of approximately 120 Hz for line frequencies in the United States.

The other frequency of concern is at approximately 3 Hz. This frequency is caused by the footfalls of a user on the treadmill deck. The ABS module 28 is designed to attenuate the 100 Hz rectification ripple with an input filter 158 prior to the isolation amplifier 150 which provides a 3 dB frequency of approximately 470 Hz and an output filter 160 at the output of the differential optical amplifier 154 as described below. The ABS module 28 also passes the 3 Hz footfall frequency to an ABS software module which provides a stabilization filter as needed.

The isolation boundary 152 of the isolation amplifier 150 provides electrical isolation between the drive buss and the microprocessor module 20. The input to the isolation amplifier 150 is converted to a digital value using a conventional A to D converter. The digital value is then serially encoded and optically transmitted across the isolation boundary 152. Once the data is across the isolation boundary 152, the data is given a fixed gain and decoded and converted into a differential analog voltage by the isolation amplifier 150. The differential amplifier 154 referred to in FIG. 10 as LM358 provides the gain to reach the desired levels. The differential optical amplifier 154 preferably has a +12 V power supply to allow it to have a full 0 V to 5 V swing.

The output filter 160 preferably receives the output of the differential optical amplifier 154 and attenuates the 100 Hz minimum rectification frequency of the buss voltage. The preferred form of the output filter 160 is a single pole filter which preferably is a combination of a 10K Ohm resistor 162 and a 1 microfarad capacitor 164. The output filter 160 provides a −3 dB frequency of approximately 16 Hz. Therefore, when the output filter 160 and the input filter 158 are combined, the attenuation of the 100 Hz minimum rectification frequency is approximately −16.5 dB and the attenuation of 120 Hz would be approximately −18 dB. The preferred specifications of the ABS module 28 include a gain of approximately 0.0078833+/−6% for 0 V</=Vbuss</=600 V and more preferably between about 200 V and 600 V to provide a buss voltage of approximately 2.49 V per processor bit and a frequency response where the 3 Hz frequency is attenuated less than 0.25 dB and the 100 Hz frequency is attenuated more than 15 dB.

Figure 11:
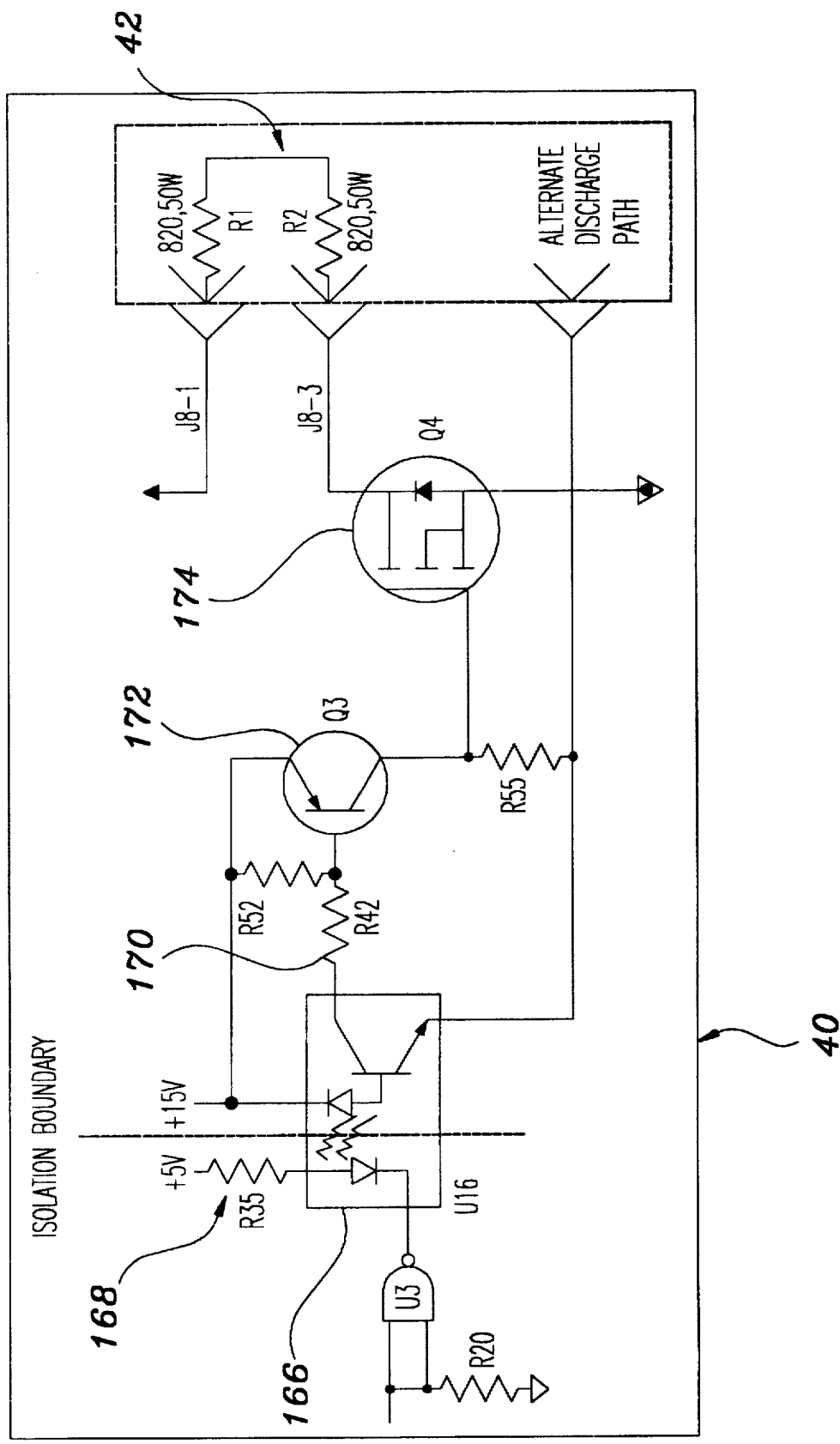
FIG. 11 is a schematic drawing of the buss recovery system module of the present invention.

As shown in FIGS. 4 and 11, the buss recovery module 40 includes an optocoupler 166, an input LED bias resistor 168, an opto output resistor 170, a gate drive transistor 172, a transistor switch 174 and the bleeder resistors 42. As described above, the BRS module 40 protects the variable speed drive system 10 from excess voltage conditions by bleeding off the excess voltage through the bleeder resistors 42. In the preferred embodiment of the present invention, the BRS module 40 is activated when the ABS module 28 indicates that the buss voltage is generally in excess of about 400 V and more preferably about 412 V and will be inactivated when the buss voltage is about 375 V and more preferably about 407 V.

As shown in FIGS. 4 and 12. The predriver module 26 includes a deadtime generator 176, a pair of chipsets in each IGBT driver for each phase, 178, 180 and 182 and various peripheral components. The predriver module 26 receives signals from the microprocessor module 20, injects a deadtime and generates gate drive output signals for the low and high side half bridge switches in the insulated gate bipolar driver module. In the preferred form of this embodiment, there is preferably a single deadtime generator 176 which receives three inputs from the microprocessor module 20 and provides three sets of outputs. The outputs are shown in FIG. 4 as three sets of two signals, with one set of three signals for each of the three pairs of chipsets and the switches in the respective IGBT driver 178, 180 and 182. The first chipset of each driver preferably controls the second chipset of the driver which then generates signals for the high side half bridge switches in the driver module 30. As shown in FIG. 12 for the Phase A signal, the current sense module 34 also interfaces between each of the high side switches and the IGBTs of the respective driver module 178, 180 or 182 to provide a similar function to the low side function described below. The deadtime generator 176 receives three electrically isolated signals though the optocouplers of the microprocessor module 20 for the A, B and C phases. The deadtime generator 176 has an internal state machine (not shown) that works with either an internal crystal oscillator, such as a parallel resonant oscillator, or an external clock to provide precise signal timing. In the preferred form of the present invention, a parallel resonant oscillator with two capacitors and a resistor are used. When a phase level change is input to the deadtime generator 176, it is first synchronized with the oscillator. The on input is then switched off for a deadtime of eight clock periods and then a complimentary output is switched on. The clock periods are preferably set using an external 16 MHz oscillator with a deadtime of approximately 500 nanoseconds. The three sets of outputs generated by the deadtime generator 176 go to each of the pairs of the chipsets. The deadtime generator 176 also includes a reset pin to keep the outputs in the off condition during start up.

The chipsets are designed to work as a set to drive the upper and lower IGBTs which are connected in the half bridge configuration. As shown in FIG. 4, the deadtime generator 176 transmits two outputs per phase and both outputs are received by the low side chipset. A pair of small pulse transformers preferably provide isolation and communication between the edge triggered receivers of the lower side drive and the upper side drive. In this embodiment, the lower side drive sends the necessary gate drive control signals to the high side driver provided that both the low and high side drivers are not required to be on at the same time. The high side driver is preferably referenced to a floating ground which is tied to the emitter of the high side driver. The present embodiment also preferably includes shut down protection circuitry to protect the power devices from the existence of an overcurrent situation. Each chipset device also has a charge pump circuit to generate a negative voltage as a gate drive off signal.

The first chipset receives two drive signals from the deadtime generator 176, one for each of the upper and lower IGBTs. The signal for the upper IGBT is passed from the first chipset to the second chipset. The signals between the first and second chipsets are provided by pulse transformers to maintain isolation. The drive signal is transmitted from the first chipset to the second chipset and the fault signals for the upper IGBTs are ORed and transmitted from the upper IGBT to the lower IGBT and then back to the microprocessor module 20. The fault signal includes an indication of the overcurrent of an IGBT and under voltage on both the positive supply and the negative charge pump generated supply. Both chipsets include internal negative charge pumps to provide negative gate off drive signals for the IGBTs. The charge pumps also provide a negative power supply regulated at 20 volts below the positive supply rail such that if a supply voltage is at +15 volts, the local driver ground will be −5 volts. The overcurrent circuit is used in a desaturation detection mode by measuring the voltage across one resistor in a resistor divider across the power transistor in the "on" state. Because the collector-emitter voltage is approximately one half the buss voltage (or 150 V, typical) during a cross-conduction condition (i.e., upper and lower transistors of a H-bridge are "on" simultaneously), sensing this voltage using the resistor divider network described above can provide effective protection against this condition. Although cross-conduction causes exceedingly high currents to flow through the drive transistors, this circuit is actually sensing "on" state collector-emitter voltage. This voltage, after attenuation by the resistor divider network, passes to an "IM" pin (not shown) which is referenced to a KG pin (KG_AL of FIG. 12) that is preferably a Kelvin ground which is intended to be connected to the kelvin source of the power device for accurate low-voltage measurements in the presence of inductive transients on the power device source terminal.

The second chipset preferably has generally the same functions as the first chipset except that it is designed for use with the high side IGBT. The drive signal is transmitted from the first chipset to the second chipset through one winding pair of a pulse transformer to provide isolation for the second chipset. Another winding pair of the pulse transformer transmits fault signals from the second chipset to the first chipset for transmission to the microprocessor module 20. Although the preferred form of the first chipset includes only one single desaturation overcurrent, the second chipset has a second overcurrent circuit ORed to the same IM pin or input.

A current sense resistor is preferably in series with the motor winding of the drive motor 38 and a differential amplifier monitors the current. Excessive current, such as 11.5 amps peak, over a period of time will cause a comparator to go high back to the IM pin which will set the overcurrent fault. The current sense resistor is preferably designed to monitor relatively long term excessive current due to the wearing of the deck and walk belt as described below. The logic ground for the second chipset is preferably a floating ground which is tied to the emitter of the top IGBT. When the IGBT is turned on, the emitter and therefore the logic ground are pulled up to the 300 V buss. The power for the second chipset during this period is provided by a large capacitor which is charged when the bottom IGBT is on. The charging diode is reverse biased when the top IGBT is on and the circuit is supplied by energy from the capacitor. Because the supply voltage for the second chipset has the charging diode drop, and the bottom IGBT Vce (on) in series, the first chipset's power supply is not adequate. The supply voltage for the second chipset is regulated down from the 24 V to 15 V by a three terminal regulator.

FIG. 13 is illustrative of the driver module 30 of the present invention and includes a plurality of power IGBTs 36. As shown in FIG. 13, the driver module 30 is generally self contained and preferably includes six transistors and diodes which are mounted and potted together. FIG. 13 also illustrates the motor windings and general location of the inputs for motor signals to the drive motor 38.

FIG. 14 is schematic of the preferred form of the power supply 44 of the present invention and is provided to illustrate the various power requirements of the modules and components of the preferred form of the present invention.

FIG. 15 is a schematic drawing of the current sense module 34 described briefly above. In the preferred form of the present invention, the current sense module 34 consists of three separate modules which continually monitor the high side current (U__A, U__B and U__C) to each of the three motor phases. Each module is preferably identical to each other and the sensing for each phase current is performed to provide protection in the event of a single fault condition as well as to provide redundancy and commonality for the operation of each phase.

The current to each motor phase is preferably sent through a resistor 184 (FIG. 13) such as a 0.02 Ohm, 4 lead resistor to create a voltage level which is sensed by the current sense module. The 4 lead resistor is used to eliminate the effect of the high current causing voltage drops in the lead impedance of the resistor such that the sense leads do not carry the high current and are internally routed from the 0.02 Ohm resistive element.

Each module includes two sense circuits to provide protection in the event of two separate types of faults which are referred to herein and shown in FIG. 15 as a slow sense circuit 186 and a fast sense circuit 188. In the event of an over current condition being sensed in either the slow or fast circuits, 186 or 188, the line known as the IM line of the high side driver is driven high to cause the high side predriver of the predriver module 26 to turn off the high side transistor immediately and report the fault condition to the microprocessor module 20.

The slow sense circuit 186 is useful to detect changes in the requirements of the variable speed drive system 10 which may occur over a relatively long period of time. For example, as the walk belt and deck gradually wear out, the power required for the motor to perform to the load specifications of the treadmill will be exceeded by the drive motor 38 because of the increased frictional resistance of the walk belt on the deck. If this condition is allowed to continue, the drive motor 38 will eventually exceed the manufacturer's specifications for the drive motor 38 and possibly overheat. If this occurs, the windings may short circuit and destroy the drive motor 38. Because this type of motor damage requires a relatively significant length of time before damage actually occurs (tens of seconds or minutes), the slow sense circuit 186 will shut down when the magnitude of the overload is relatively small. Additionally, because the heating of the motor windings occurs as a result of the average current used by the drive motor 38, a safe thermal equilibrium may be obtained while the current swings above and below the steady state maximum as long as the average current value is at or below a predetermined maximum value. The predetermined maximum value is preferably chosen based on the specifications or rating of the drive motor 38. Therefore, in order to sense legitimate over current conditions, momentary over current conditions, such as those encountered with the footfalls of a user, must be filtered to provide an accurate average current value and then when the average value exceeds the preselected motor current rating, the variable speed drive system 10 is shut down to protect the drive motor 38 before damage actually occurs.

Due to the low level voltages generated by the current sense resistor and the electrically noisy environment of the high side switching, a differential input stage 190 (FIG. 15) consisting of an operational amplifier 194 and the resistors which are shown as R2–R5 in FIG. 15 are used to provide a typical voltage gain of −18.33. The diodes 192, which are shown as D1–4 in FIG. 15, rectify the output of the operational amplifier 194 so that only the motor voltages which are less than the insulated gate bipolar transistor output voltages have a non zero gain and the IGBT out signals are approximately equal to the logic ground voltages of the high side predriver (such as 4411LG shown in FIG. 15) that provide the ground reference for the high side predriver circuits. The rectification of the output of the resistors 190 provide a signal which, assuming the input voltage is sinusoidal, has an average value of 0.3183 times the peak of the sinusoid, or 0.45 times the RMS of the sinusoid. When this is combined with the input stage gain, an overall gain of 5.8355 times the average value of the sinusoid or 8.25 times the RMS value of the sinusoid is achieved.

The resistor 196 shown as R7 and the capacitor 198 shown as C3 then filter the rectified signal from diodes 192. With a typical time constant of 2.2 seconds and −3 dB point of 0.0722 Hz, the filter (196 and 198) is used to provide both an average value after the rectification but also to filter out the effect of current surges due to footfalls by the user. After filtering by 196 and 198, the voltage is then compared to a 1.235 V level generated by the precision rectifier 200 shown in FIG. 15 as U2 and a resistor 202 shown in FIG. 15 as R8. The comparison is performed by an operational amplifier 220 and when the filtered voltage exceeds 1.235 V, the output of the operational amplifier 220 goes high. In a normal mode which is not over current, the output is approximately equal to the signal represented as Vee or −6 V with respect to the logic ground of the high side predriver module 26. When an over current occurs, the output of the operational amplifier 220 changes to approximately a signal represented as Vdd or +15 V with respect to the logic ground of the high side predriver. When the output exceeds the signal shown as IGBTKG by the diode drop of one of the diodes 204 shown as D2–3, it is scaled by a factor of approximately 0.45 by resistors 206 shown in FIG. 15 as R9 and R1 and routed to the line shown as IM input. When this input exceeds 0.24 VDC to 0.45 VDC the respective IGBT driver 178, 180 or 182 turns off the high side transistor and sends a fault indication signal to the microprocessor module 20.

The circuitry of the variable speed drive system 10 can survive direct short circuits for only short periods of time exceeding 10 microseconds. As described above, the slow sense circuit 186 responds in the range of seconds to protect the drive motor 38. Therefore, a fast current sense circuit 188 is also provided to protect the variable speed drive system 10. The fast current sense circuit 188 is designed to rapidly sense large high side currents such as currents in excess of 20 A. When a fault is sensed by the fast current sense circuit 188, the high side transistor is turned off and a fault indication signal is sent to the microprocessor module 20.

The fast current sense circuit 188 includes a differential amplifier at the input stage. As shown in FIG. 15, the resistors 210 shown as R10–R13 and operational amplifier 212 shown as U1-B provide a differential gain of approximately −2.93 typical. The resistor 214 shown as R14 and the capacitor 216 shown as C2 form a network which is a high frequency filter which attenuates noise. The resistor 218 shown as R15 provides a small amount of hysteresis to the operational amplifier around 200 mV so that the circuit does not repeatedly turn on and off if the voltage input fluctuates near the threshold level. When the voltage input to the operational amplifier 212 (U1-A) exceeds 1.235 V typical, the output of the operational amplifier 212 (U1-A) goes high. In a normal mode without an over current situation, the output of the operational amplifier 212 is approximately equal to the signal represented as Vee or −6 V with respect to the logic ground of the IGBT driver 178, 180 or 182. When an over current situation occurs, the output of the operational amplifier 212 changes to a value approximately equal to the signal represented as Vdd or +15 V with respect to the logic ground of the IGBT driver 178, 180 or 182. When the output exceeds the signal represented by IGBTKG by the diode drop of diodes 204, the output is scaled by a factor of approximately 0.9 by the resistor 222 shown as R16 and the resistor 206 shown as R1 and routed to the IGBT driver 178, 180 or 182 shown as IM input. When this input exceeds 0.24 VDC to 0.45 VDC (0.30 VDC typical) the IGBT driver 178, 180 or 182 turns off the high side transistor and sends a fault indication to the microprocessor module 20.

The current sense module 34 also includes several other components which are not specifically required to meet the requirements of the current sense modules described above. The first component is a pull up resistor shown as R17. In normal operation, the 0.02 Ohm sense resistor is between "Motor" and "IGBTout". To ease in-circuit testing of the module, a removable jumper (not shown) is placed between the 0.02 Ohm resistor and "IGBTout". This allows the "IGBTout" signal to be driven positive with respect to the "Motor" signal without having to drive the 0.02 Ohm impedance of the sense resistor. If the jumper is not in place, the sense circuitry's proper operation cannot be assured. In this situation, the pullup resistor causes the "IGBTout" signal to be approximately equal to the signal represented as Vdd or +15 V with respect to the logic ground of the IGBT driver 178, 180 or 182 and both the slow and fast current sense circuits, 186 and 188, will go into a fault mode to prevent treadmill operation. When the jumper is in place, the "IGBTout" will have the same potential as the signal represented as IGBTKG and which is approximately equal to the logic ground of the IGBT driver 178, 180 or 182.

The current sense module 34 also includes Vee generator components that are required for the operation of the IGBT driver 178, 180 or 182. Various capacitors and diodes (not shown) are also required as external components for the operation of the internal controller of the IGBT driver 178, 180 or 182. When the Vee generator is combined with the IGBT driver 178, 180 or 182, a voltage of approximately 21 V less than the signal represented as Vdd voltage is generated and the signal represented as Vee voltage is typically about −6 V with respect to the logic ground of the IGBT driver 178, 180 or 182.

The current sense module 34 also includes a member described as the IM termination component. The IM termination component consists of a resistor, such as resistor 206 in parallel with a capacitor 224, such as C10, to provide further cross conduction protection. When the high side drive transistor is off, the IGBT driver 178, 180 or 182 shorts the line shown as the IM line to the signal represented as IGBTKG. When the IGBT driver 178, 180 or 182 sends out the signal to turn on the high side drive transistor, it releases the line shown as IM to the signal represented as IGBTKG to short and allows the IM line to be driven externally. As described above, if the voltage reaches 0.3 V typical, the high side transistor is turned off and a fault indication is sent to the microprocessor module 20. Two 280K Ohm resistors (not shown) are connected in series from the collector of the high side drive transistor to the IM line. The IGBTKG line is connected to the emitter of the high side drive transistor. This circuit is designed to turn off the transistor if a cross conduction situation occurs so that approximately one half of the full buss voltage will be dropped across the collector/emitter of both of the high and low side transistors. When the high side transistor is off, the approximately 300 V which pass across the collector/emitter of the high side drive transistor would generate a voltage of 10.6 V at the IM line if it was not shorted to the IGBTKG line by the internal controller of the IGBT driver 178, 180 or 182. When the transmitter/emitter is on, the collector/emitter voltage drops to less than 4 V. This represents a voltage of 0.14 V at the IM line which is significantly below the 0.25 V which is the minimum fault level.

The capacitor 224 shown as C10 provides the delay necessary to allow the high side transistor to be turned on. Because there is a finite time between when the IGBT driver 178, 180 or 182 sends the signal to turn on the transistor, releases the short between the IM line and IGBTKG and when the transistor is fully on, the capacitor 224 provides the delay necessary to prevent an accidental fault voltage at the IM line. The capacitor 224 is sized to ensure that the transistor's collector/emitter voltage during turn on does not present a fault voltage at the IM line even during high line conditions while ensuring that a cross conduct condition of 100 V across the collector/emitter when fully on is terminated as rapidly as possible and within 10 microseconds or less.

What is claimed is:

1. An AC drive motor system for a treadmill having a microprocessor module, predriver module and driver module therein to provide pulse width modulated signals to a drive motor and a current sensing circuit therein, the circuit including;

a fast sense circuit for detecting the occurrence of a first current in excess of a predetermined value for an AC drive motor system to prevent rapid damage to said AC drive motor system wherein said fast sense circuit senses the current of pulse width modulated signals between the driver module and the drive motor wherein said signals have controlled cycles and when said current of said sensed signal is greater than a predetermined threshold, said fast sense circuit sends a fault signal to said predriver module to close a switch for the remainder of said cycle of said sensed signal; and a slow sense circuit to detect the occurrence of a second current in excess of a predetermined value which is caused by a gradual fault condition wherein said fault condition results from the increased frictional resistance to the rotation of the walk belt of a treadmill on a treadmill deck.

2. The current sensing circuit of claim 1 wherein the slow sense circuit monitors the average current value of the current supplied to an AC motor over a predetermined time period such that when the average current value exceeds a preselected motor current rating for said AC motor, the sensing circuit shuts down said AC drive motor system to prevent damage to said AC motor by sending a fault signal to the microprocessor.

3. The current sensing circuit of claim 2 wherein said slow sense circuit filters out transient current values which exceed said preselected motor current rating and which do not trigger the fast sense circuit to prevent the inadvertent shut down of said AC drive motor system.

4. The current sensing circuit of claim 1 wherein said slow sense circuit and said fast sense circuit monitor the current of pulse width modulated signals supplied to said AC motor by the driver module.

5. The current sensing circuit of claim 4 wherein said pulse width modulated signals are formed by a pulse width modulated signal generator.

6. The current sensing circuit of claim 5 wherein said slow sense circuit and said fast sense circuits monitor three phases of pulse width modulated signals to said AC motor.

7. The current sensing circuit of claim 1 wherein said slow sense circuit and said fast sense circuit generate signals which are received by a microprocessor module as a fault signal to cause the shut down of said AC drive motor system until said AC drive motor system is reset if further faults are received.

8. The current sensing circuit of claim 1 wherein said slow sense circuit and said fast sense circuit generate further signals which are received by a controller module as a fault signal to notify the user of the shut down of said AC drive motor system.

9. The current sensing circuit of claim 1 wherein said slow sense circuit and said fast sense circuit generate signals which are in addition to a voltage dissipation circuit having voltage dissipation circuitry to dissipate excess bus voltage in said AC drive motor system.

10. An AC drive motor system for a treadmill having a current sensing circuit therein, the circuit including a fast sense circuit for detecting the occurrence of a first current of a pulse width modulated signal in excess of the predetermined value for an AC drive motor system to prevent damage to said AC drive motor system wherein said fast sense circuit sends a fault signal to a predriver module to shut down a switch for the remainder of the cycle of said sensed first current of said pulse width modulated signal; and a slow sense circuit which monitors the average current value between a driver module and the AC motor of said AC drive motor system to detect the occurrence of a gradual fault condition where the average current exceeds a predetermined value over a predetermined period of time and wherein said average current value is less than said predetermined value for said fast sense circuit.

11. The AC drive motor system of claim 10 wherein said slow sense current senses the increase in operating current required by said AC motor as a result of increased frictional resistance to the rotation of the walk belt of the treadmill over the treadmill deck.

12. The AC drive motor system of claim 10 wherein said fast sense circuit senses is triggered by current values in excess of 20 A.

13. The AC drive motor system of claim 10 wherein said slow sense circuit senses is triggered by current values in excess of 7.5 A.

14. The AC drive motor system of claim 10 wherein said fast sense circuit includes a differential amplifier.

15. The AC drive motor system of claim 10 wherein said slow sense circuit responds in the range of seconds and the response of said fast sense circuit is less than one second.

16. The current sensing circuit of claim 10 wherein said slow sense circuit and said fast sense circuit monitor the current of said pulse width modulated signals between said driver module of said AC drive motor system and said AC motor to determine if said sensed currents as sensed by said slow sense circuit and said fast sense circuit are above certain different predetermined thresholds.

17. The current sensing circuit of claim 10 further including a filter of approximately 3 Hz therein to remove the noise caused by footfalls of a user.

18. A method of detecting the presence of potentially damaging over current situations with an AC motor having a variable speed drive motor controller system comprising the steps of:

providing a DC current to the system;

pulse width modulating the DC current to produce a drive signal which appears to an AC motor as an alternating current signal of a predetermined frequency and voltage;

sensing the current of the drive signal with a slow sense circuit and a fast sense circuit wherein the slow sense circuit monitors the average current value over a predetermined period of time and the fast sense circuit monitors the non-averaged value of the current supplied to the AC motor and the fast sense circuit sends a first fault signal to a first portion of the system to discontinue the remainder of the cycle of the sensed signal and wherein a further fault signal is sent to another portion of the system by the fast sense circuit to shut down the AC motor when multiple fault signals are generated by the fast sense circuit.

19. The method of claim 18 wherein a fault signal is generated by the slow sense circuit when the average current value exceeds a predetermined value over a predetermined period of time and the fault signal generated by the slow sense circuit causes the system to shut down the AC motor.

20. The method of claim 19 wherein the fast sense circuit generates said fault signals in response to the sensing of a current in excess of a predetermined current value which is greater than the average current value which generates a fault signal from the slow sense circuit.

21. The method of claim 20 wherein the fault signals generated by the fast sense circuit and the slow sense circuits are received by a predriver module and a microprocessor module.

* * * * *